US012429800B2

(12) United States Patent
Iriyama et al.

(10) Patent No.: US 12,429,800 B2
(45) Date of Patent: Sep. 30, 2025

(54) IMAGE FORMING APPARATUS WITH FIXING DEVICE HAVING LEVER AND FIXED HANDLE

(71) Applicant: BROTHER KOGYO KABUSHIKI KAISHA, Nagoya (JP)

(72) Inventors: Shota Iriyama, Toyokawa (JP); Daisuke Ishizuka, Nagoya (JP); Misato Osuka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/435,136

(22) Filed: Feb. 7, 2024

(65) Prior Publication Data

US 2024/0264556 A1 Aug. 8, 2024

(30) Foreign Application Priority Data

Feb. 7, 2023 (JP) ................................. 2023-016738
Feb. 7, 2023 (JP) ................................. 2023-016739

(51) Int. Cl.
*G03G 15/20* (2006.01)
*G03G 21/16* (2006.01)

(52) U.S. Cl.
CPC ..... *G03G 15/2032* (2013.01); *G03G 21/1685* (2013.01)

(58) Field of Classification Search
None
See application file for complete search history.

(56) References Cited

U.S. PATENT DOCUMENTS 5,579,098 A * 11/1996 Noguchi ............ G03G 15/2064 399/122
9,874,852 B2 * 1/2018 Boyatt, III ......... G03G 21/1685
10,036,987 B2 * 7/2018 Nanno ............... G03G 15/2032
2013/0004203 A1 1/2013 Ohnishi
2018/0333974 A1 11/2018 Yamano et al.
2024/0319662 A1 * 9/2024 Minoshima ........ G03G 21/1647

FOREIGN PATENT DOCUMENTS

JP H0252780 A 2/1990
JP H11202722 A 7/1999
JP H11212428 A 8/1999

(Continued)

*Primary Examiner* — Arlene Heredia
(74) *Attorney, Agent, or Firm* — Scully, Scott, Murphy & Presser, P.C.

(57) ABSTRACT

An image forming apparatus includes a main housing, a process unit, and a fixing device including a lever. The main housing comprises an interlock switch that allows power to be supplied to a heater of the fixing device in an on-state and shuts off power to the heater in an off-state. The lever includes a holding portion and a switch contacting portion contactable with the interlock switch. In a case where the fixing device is installed in the main housing and the lever is located at a first position, the switch contacting portion is in contact with the interlock switch to set the interlock switch to the on-state. In a case where the fixing device is installed in the main housing and the lever is located at a second position, the switch contacting portion is separated from the interlock switch to set the interlock switch to the off-state.

20 Claims, 13 Drawing Sheets

(56) References Cited

FOREIGN PATENT DOCUMENTS

| | | | |
|---|---|---|---|
| JP | 2002252074 | A | 9/2002 |
| JP | 2013011822 | A | 1/2013 |
| JP | 2017203944 | A | 11/2017 |
| JP | 2018194824 | A | 12/2018 |
| JP | 2020154156 | A | 9/2020 |

* cited by examiner

IMAGE FORMING APPARATUS WITH FIXING DEVICE HAVING LEVER AND FIXED HANDLE

REFERENCE TO RELATED APPLICATIONS

This application claims priority from Japanese Patent Application Nos. 2023-016738 and 2023-016739 filed on Feb. 7, 2023. The entire contents of the priority applications are incorporated herein by reference.

BACKGROUND ART

An image forming apparatus known in the art includes a fixing device including a heater and configured to be installable into and removable from the image forming apparatus. In such an image forming apparatus, a handle of the fixing device is grasped to install or to remove the fixing device into or from the image forming apparatus with a cover opened.

SUMMARY

It is desirable to remove a fixing device from a main housing with power to a heater shut off.

Thus, the present disclosure provides an image forming apparatus which allows removal of a fixing device with power to a heater shut off. Further, the present disclosure shuts off power to the heater in a process in which the fixing device is being removed from an installation position in the image forming apparatus.

In one aspect, an image forming apparatus disclosed herein comprises a main housing, a process unit, and a fixing device.

The process unit forms a toner image on a sheet. The fixing device is installable in and removable from an installation position in the main housing and fixes the toner image on the sheet. The fixing device comprises a heating member, a pressure member, and a lever. The heating member includes a heater. The pressure member nips the sheet in combination with the heating member. The lever is movable between a first position and a second position.

The main housing comprises an interlock switch. The interlock switch allows power to be supplied to the heater in an on-state and shuts off power to the heater in an off-state. The lever includes a holding portion and a switch contacting portion. The holding portion is graspable when the fixing device is to be removed from the main housing. The switch contacting portion is contactable with the interlock switch.

In a case where the fixing device is installed in the installation position in the main housing and the lever is located at the first position, the switch contacting portion is in contact with the interlock switch to set the interlock switch to the on-state.

In a case where the fixing device is installed in the installation position in the main housing and the lever is located at the second position, the switch contacting portion is separated from the interlock switch to set the interlock switch to the off-state.

In the event that the fixing device is to be removed, the lever is moved from the first position to the second position to separate the switch contacting portion of the lever from the interlock switch. Thus, the fixing device can be removed with power to the heater shut off.

The image forming apparatus may be configured such that in a case where the fixing device is installed in the installation position in the main housing and the holding portion is not grasped, the lever is located at the first position, and in a case where the fixing device is installed in the installation position in the main housing and the holding portion is grasped, the lever is located at the second position.

The lever may be rotatable between the first position and the second position about a lever axis.

The image forming apparatus may be configured such that the lever includes an engagement portion that engages the main housing and restricts the fixing device from being disengaged from the main housing when the lever is located in the first position.

Since the lever includes the engagement portion, both of the switch contacting portion and the engagement portion can be moved by grasping the lever. Thus, operation of the interlock switch and disengagement of the fixing device can be performed by one operation.

The image forming apparatus may be configured such that the lever is rotatable between the first position and the second position about a lever axis, and a distance from the lever axis to the switch contacting portion is greater than a distance from the lever axis to the engagement portion.

Since the switch contacting portion is located farther, than the engagement portion, from the lever axis, an amount of travel of the switch contacting portion is greater than an amount of travel of the engagement portion when the lever rotates from the first position to the second position. Thus, a sufficient amount of travel of the switch contacting portion for operating the interlock switch can be obtained more easily when the lever rotates from the first position to the second position.

The image forming apparatus may be configured such that the switch contacting portion is a protrusion protruding in a direction of rotation of the lever. The engagement portion may be a protrusion protruding in the direction of rotation of the lever and may be located upstream of the switch contacting portion in an installation direction in which the fixing device is installed into the main housing. The main housing may have an engagement hole configured to receive the engagement portion and to restrict the fixing device from being disengaged from the main housing when the engagement portion is received in the engagement hole. A dimension of the engagement hole in an axial direction of the lever axis may be smaller than a dimension of the switch contacting portion in the axial direction.

With the dimension of the engagement hole in the axial direction of the lever axis being smaller than the dimension of the switch contacting portion in the axial direction, the switch contacting portion can be restrained from being received in the engagement hole.

The image forming apparatus may be configured such that the lever is rotatable between the first position and the second position about a lever axis, and the switch contacting portion is located at a position different from a position in which the engagement portion is located in an axial direction of the lever axis.

Since the switch contacting portion is located at a position different from a position in which the engagement portion is located, the switch contacting portion can be restrained from being received in the engagement hole.

The image forming apparatus may be configured such that when the lever is moved from the first position to the second position, the holding portion moves in a direction that is the same as a direction in which the fixing device is removed from the installation position in the main housing.

Since the direction of rotation of the lever for disengaging the engagement portion from the main housing and the direction of rotation of the fixing device for removing the fixing device is the same, the lever can be operated more easily compared to an alternative configuration in which the lever is rotated in an opposite direction.

The image forming apparatus may be configured such that the fixing device further comprises a fixed handle having a grip graspable when removing the fixing device. The holding portion of the lever may be located closer to the grip when the lever is located in the second position than when the lever is located in the first position.

Since the holding portion of the lever is located closer to the grip when the lever is located in the second position than when the lever is located in the first position, the holding portion of the lever and the grip of the fixed handle can be held at the same time more easily when the fixing device is removed. By grasping the holding portion and the grip at the same time, the rigidity of the lever can be supplemented.

The image forming apparatus may be configured such that an axial direction of the lever axis is a widthwise direction of the sheet.

With the lever axis of the lever being the widthwise direction of the sheet, the lever can be operated more easily.

In another aspect, an image forming apparatus disclosed herein comprises a main housing, a process unit, and a fixing device.

The process unit forms a toner image on a sheet. The fixing device is installable in and removable from an installation position in the main housing and configured to fix the toner image on the sheet. The fixing device comprises a heating member, a pressure member, and a lever. The heating member includes a heater. The pressure member nips the sheet in combination with the heating member. The lever is rotatable between a first position and a second position about a lever axis extending in an axial direction.

The main housing comprises an interlock switch. The interlock switch allows power to be supplied to the heater in an on-state, and to shut off power to the heater in an off-state.

The lever includes a switch contacting portion and a to-be-pressed portion. In a case where the fixing device is installed in the installation position in the main housing and the lever is located in the first position, the switch contacting portion is in contact with the interlock switch to set the interlock switch to the on-state. In a case where the fixing device is installed in the installation position in the main housing and the lever is located in the second position, the switch contacting portion is separated from the interlock switch to set the interlock switch to the off-state. The to-be-pressed portion is located between the lever axis and the switch contacting portion in an installation direction in which the fixing device is installed into the main housing. The to-be-pressed portion is pressed by the main housing and causes the lever to rotate from the first position toward the second position in a process of the fixing device being removed from the installation position.

Since the to-be-pressed portion of the lever, pressed by the main housing in the process of the fixing device being removed from the installation position, is located between the lever axis and the switch contacting portion, an amount of travel of the switch contacting portion becomes greater than an amount of travel of the to-be-pressed portion when the to-be-pressed portion is pressed by the main housing. If the amount of travel of the switch contacting portion is greater than the amount of travel of the to-be-pressed portion, the interlock switch assumes the off-state more easily compared to an alternative configuration in which the amount of travel of the switch contacting portion is smaller than the amount of travel of the to-be-pressed portion. Thus, power to the heater can be shut off in the process of the fixing device being removed from the installation position.

The image forming apparatus may be configured such that when the fixing device rotates from the installation position about a first axis in the process of removing the fixing device from the installation position, the to-be-pressed portion of the lever is pressed by the main housing causing the lever to rotate.

With the to-be-pressed portion being pressed by the main housing causing the lever to rotate, the interlock switch can assume the off-state more easily.

The image forming apparatus may be configured such that a direction of rotation of the fixing device in the process of removing the fixing device from the installation position is the same as a direction of rotation of the lever from the first position to the second position.

Since the direction of rotation of the fixing device is the same as the direction of rotation of the lever, the fixing device can be easily rotated while rotating the lever when removing the fixing device.

The image forming apparatus may be configured such that the to-be-pressed portion is located between the first axis and the lever axis in the installation direction.

The image forming apparatus may be configured such that the lever further includes an engagement portion configured to engage the main housing and restrict the fixing device from being disengaged from the main housing when the lever is located in the first position.

With the lever including the engagement portion, both of the switch contacting portion and the engagement portion can be moved by grasping the lever. Thus, operation of the interlock switch and disengagement of the fixing device can be performed by the same operation.

The image forming apparatus may be configured such that a distance from the lever axis to the switch contacting portion is greater than a distance from the lever axis to the engagement portion.

Since the switch contacting portion is located farther, than the engagement portion, from the lever axis, an amount of travel of the switch contacting portion is greater than an amount of travel of the engagement portion when the lever is rotated from the first position to the second position. Thus, a sufficient amount of travel of the switch contacting portion for operating the interlock switch can be obtained more easily when the lever rotates from the first position to the second position.

The image forming apparatus may be configured such that the lever includes a holding portion graspable when the fixing device is to be removed from the main housing. In a case where the fixing device is installed in the installation position in the main housing and the holding portion is not grasped, the lever may be located in the first position. In a case where the fixing device is installed in the installation position in the main housing and the holding portion is grasped, the lever may rotate from the first position to the second position.

By grasping the holding portion, the fixing device can be removed with power to the heater shut off.

The image forming apparatus may be configured such that the axial direction of the lever axis is a widthwise direction of the sheet.

With the axial direction of the lever axis of the lever being the widthwise direction of the sheet, the lever can be operated more easily.

BRIEF DESCRIPTION OF DRAWINGS

The above aspects, other advantages and further features will become more apparent by describing in detail illustrative, non-limiting embodiments thereof with reference to the accompanying drawings, in which.

DESCRIPTION

Figure 1:
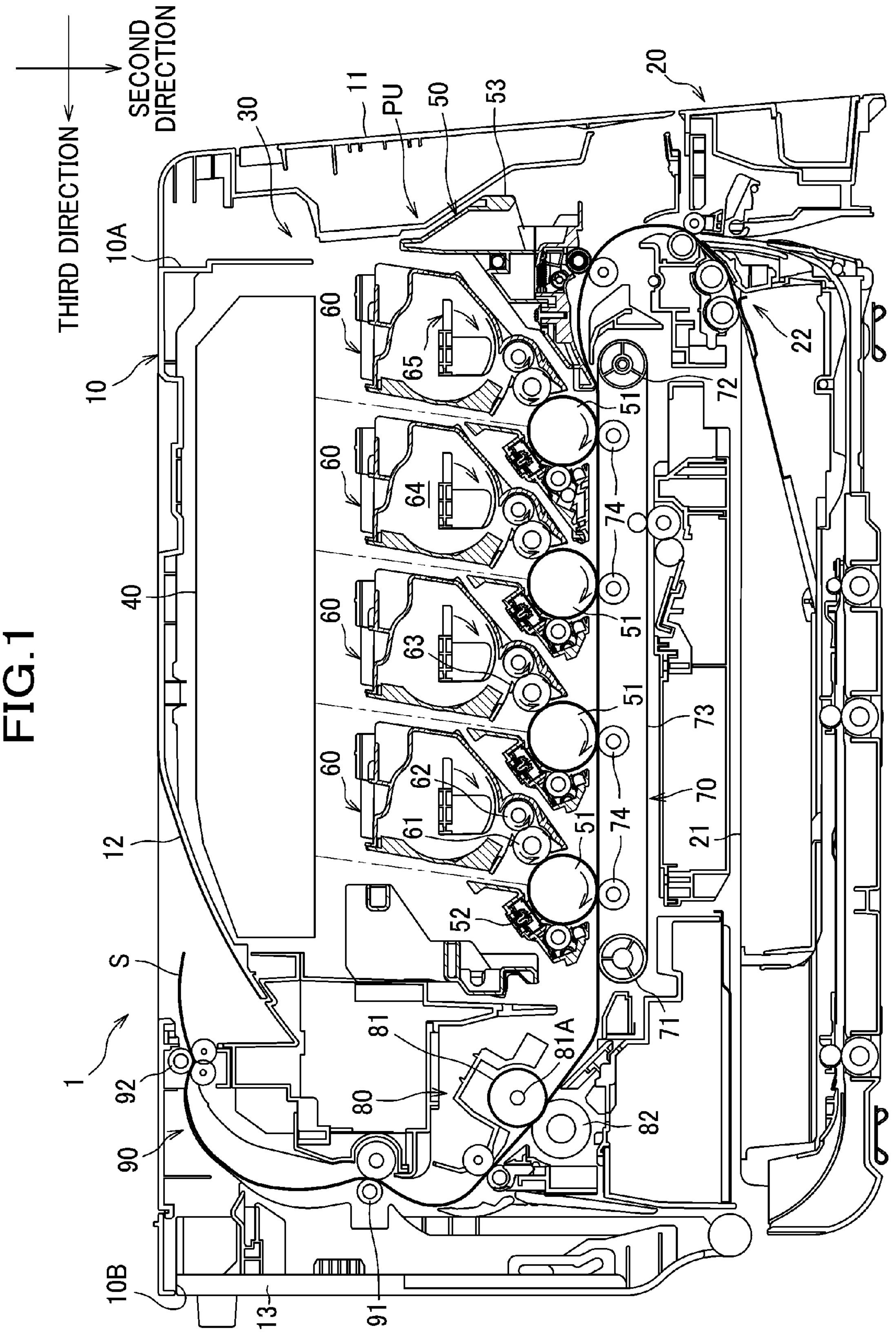
FIG. 1 is a cross-sectional view of an image forming apparatus.

An embodiment of the present disclosure will be described in detail referring to the drawings where appropriate.

As shown in FIG. 1, an image forming apparatus 1 comprises a main housing 10, a sheet feeder unit 20, a process section 30, a fixing device 80, and a sheet ejection unit 90.

The main housing 10 comprises a front cover 11, an output tray 12, and a rear cover 13. The main housing 10 has an opening 10A on a front side thereof and an opening 10B on a rear side thereof. The front cover 11 opens and closes the opening 10A. The rear cover 13 opens and closes the opening 10B.

The sheet feeder unit 20 comprises a sheet tray 21 and a feeding mechanism 22. The sheet tray 21 contains sheets S of paper or the like. The feeding mechanism 22 feeds the sheets S in the sheet tray 21 to the process section 30.

The process section 30 forms a toner image on each sheet S. The process section 30 comprises an exposure device 40, a process unit PU, and a transfer unit 70.

The exposure device 40 is located above the process unit PU. The exposure device 40 emits a light beam to expose a surface of a photosensitive drum 51.

The process unit PU is located between the sheet tray 21 and the exposure device 40. The process unit PU is installable into and removable from the main housing 10 through the opening 10A of the main housing 10, which is opened by opening the front cover 11. The process unit PU comprises a drum cartridge 50 and a plurality of toner cartridges 60.

The drum cartridge 50 comprises a plurality of photosensitive drums 51, a plurality of chargers 52 corresponding to each of the photosensitive drums 51, and a drum frame 53.

The drum frame 53 supports the photosensitive drums 51 and the chargers 52. The drum frame 53 is movably supported by the main housing 10. The toner cartridges 60 are installable onto and removable from the drum frame 53.

The plurality of toner cartridges 60 each contains toner of a different color. Each toner cartridge 60 comprises a development roller 61, a supply roller 62, a doctor blade 63, a toner containing unit 64 that contains toner, and an agitator 65.

The agitator 65 agitates toner in the toner containing unit 64. The agitator 65 supplies toner to the supply roller 62. The supply roller 62 supplies toner to the development roller 61. The doctor blade 63 adjusts the thickness of toner on the development roller 61 to a uniform thickness.

The transfer unit 70 is located between the sheet tray 21 and the process unit PU. The transfer unit 70 comprises a drive roller 71, a follower roller 72, a conveyor belt 73, and a plurality of transfer rollers 74. The conveyor belt 73 is an endless belt for conveying the sheet S. The drive roller 71 and the follower roller 72 cause the conveyor belt 73 to rotate. The transfer rollers 74 face an inner surface of the conveyor belt 73. The conveyor belt 73 is sandwiched between the transfer rollers 74 and the photosensitive drums 51.

The fixing device 80 comprises a heating roller 81 as an example of a heating member, and a pressure roller 82 as an example of a pressure member. The heating roller 81 includes a heater 81A. The heating roller 81 receives a driving force from a drive source (not shown) and rotates.

The pressure roller 82 nips the sheet S in combination with the heating roller 81. The pressure roller 82 is driven by the heating roller 81 and rotates.

The chargers 52 charge the respective surfaces of the photosensitive drums 51. The exposure device 40 exposes the surfaces of the photosensitive drums 51. Electrostatic latent images are thereby formed on the photosensitive drums 51. The development rollers 61 supply toner to the respective photosensitive drums 51. Toner images are thereby formed on the photosensitive drums 51.

The sheet feeder unit 20 feeds the sheet S through between the photosensitive drums 51 and the transfer rollers 74. The toner images on the photosensitive drums 51 are transferred onto the sheet S. The sheet S on which the toner images are transferred is conveyed through between the heating roller 81 and the pressure roller 82. The fixing device 80 thereby thermally fixes the toner images onto the sheet S.

The sheet ejection unit 90 comprises a conveyor roller 91 and an ejection roller 92. The conveyor roller 91 conveys the sheet S to the ejection roller 92. The ejection roller 92 ejects the sheet S onto the output tray 12.

Figure 2:
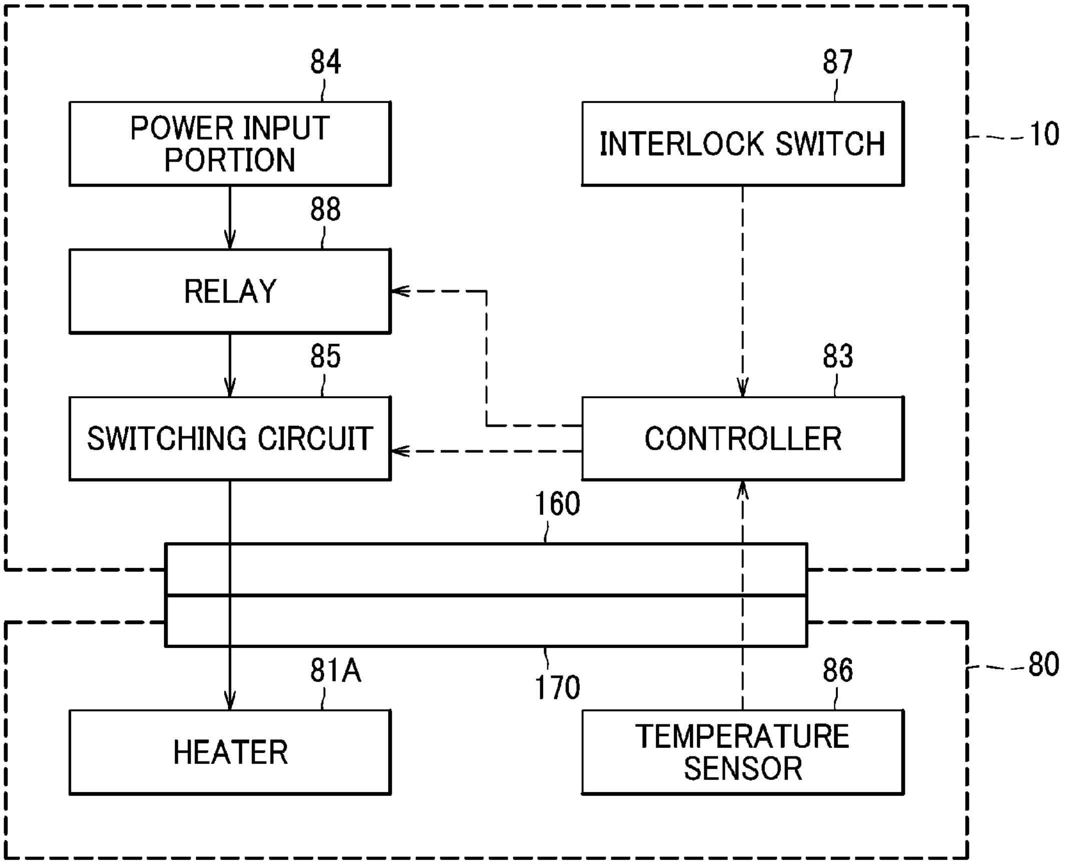
FIG. 2 is a block diagram showing electrical connections between components of the image forming apparatus.

As shown in FIG. 2, the image forming apparatus 1 further comprises a controller 83, a power input portion 84, a switching circuit 85, a temperature sensor 86, an interlock switch 87, a relay 88, a housing connector 160, and a fixing connector 170. The controller 83, the power input portion 84, the switching circuit 85, the interlock switch 87, and the housing connector 160 are provided at the main housing 10. The temperature sensor 86 and the fixing connector 170 are provided at the fixing device 80.

The controller 83 includes a central processing unit (CPU), a random-access memory (RAM), a read-only memory (ROM), an input/output circuit, etc., and performs various arithmetic processing based on programs and/or data stored in the ROM or other components to execute control.

The power input portion 84 is connected to an AC power source and supplies power to the switching circuit 85.

The relay 88 is provided between the power input portion 84 and the switching circuit 85. The relay 88 is switchable between a connected state in which power is supplied from the power input portion 84 to the switching circuit 85, and a shut-off state in which power is not supplied from the power input portion 84 to the switching circuit 85. The relay 88 comprises a moving contact that switches the relay 88 to the connected state and to the shut-off state, and an electromagnet that operates the moving contact. The electromagnet operates in response to a command from the controller 83 to switch the moving contact.

The switching circuit 85 comprises a semiconductor device such as triac. The switching circuit 85 is a circuit capable of supplying or shutting off power to the heater 81A, in response to a command from the controller 83.

The temperature sensor 86 measures the temperature of the heating roller 81. Information of the measured temperature of the heating roller 81 is transmitted to the controller 83. The controller 83 transmits a command to the switching circuit 85 based on the information from the temperature sensor 86.

The interlock switch 87 has an on-state in which the interlock switch 87 allows power to be supplied to the heater 81A, and an off-state in which the interlock switch 87 shuts off power to the heater 81A.

Figure 8A:
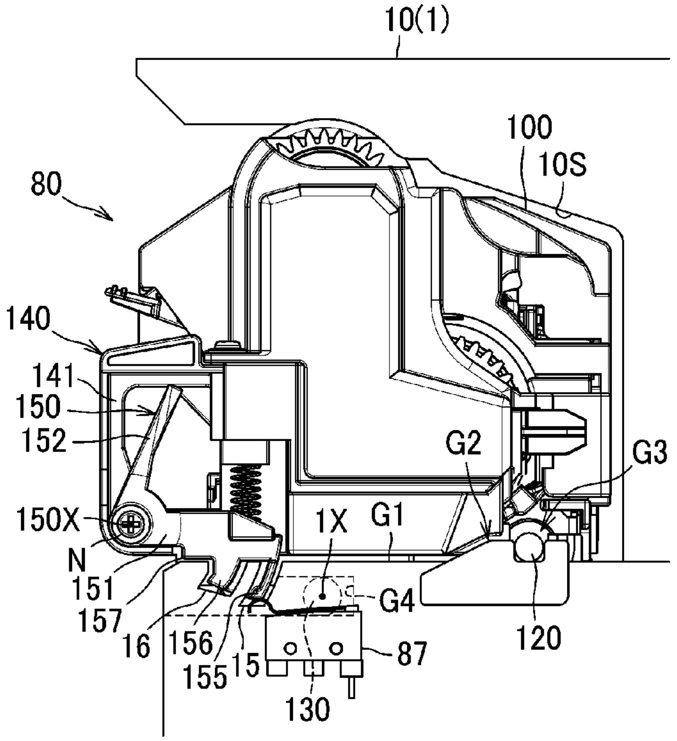
FIG. 8A is an illustration showing the fixing device located in the installation position with the lever located in the first position.
Figure 8B:
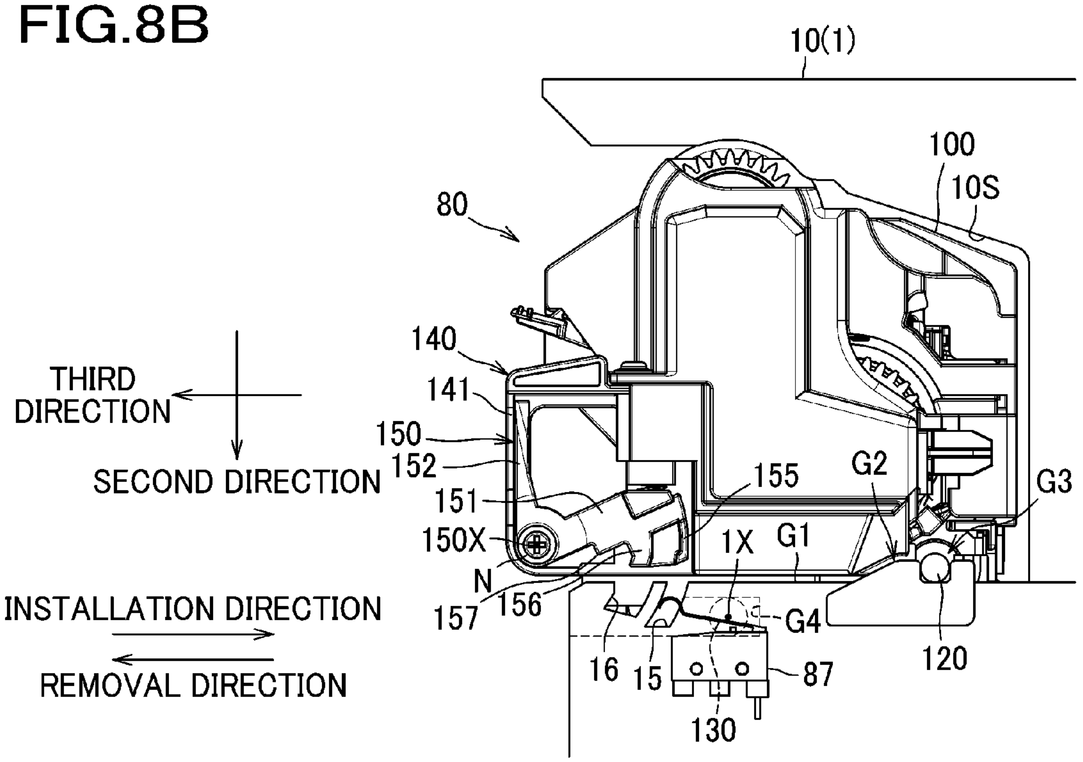
FIG. 8B is an illustration showing the fixing device located in the installation position with the lever located in the second position.

Specifically, as shown in FIGS. 8A, 8B, the interlock switch 87 is located under the fixing device 80. The interlock switch 87 comprises a displaceable arm. Specifically, the arm of the interlock switch 87 is displaceable to an on-state shown in FIG. 8A and to an off-state shown in FIG. 8B. The interlock switch 87 assumes an electrically-continuous state when the arm is pressed against a lever 150 which will be described later, and assumes an electrically-noncontinuous state when the arm is not pressed against the lever 150.

In the present embodiment, the controller 83 determines that the interlock switch 87 is in the on-state when the interlock switch 87 assumes the electrically-continuous state and switches the relay 88 to the connected state. The controller 83 determines that the interlock switch 87 is in the off-state when the interlock switch 87 assumes the electrically-noncontinuous state and switches the relay 88 to the shut-off state. When the relay 88 is in the shut-off state, power to the switching circuit 85 is shut off, shutting off power to the heater 81A.

The housing connector 160 is connected to the fixing connector 170 when the fixing device 80 is installed in the main housing 10. When the housing connector 160 is connected to the fixing connector 170, power is suppliable from the switching circuit 85 to the heater 81A. Further, when the housing connector 160 is connected to the fixing connector 170, the temperature information detected by the temperature sensor 86 is transmittable to the controller 83.

Figure 11A:
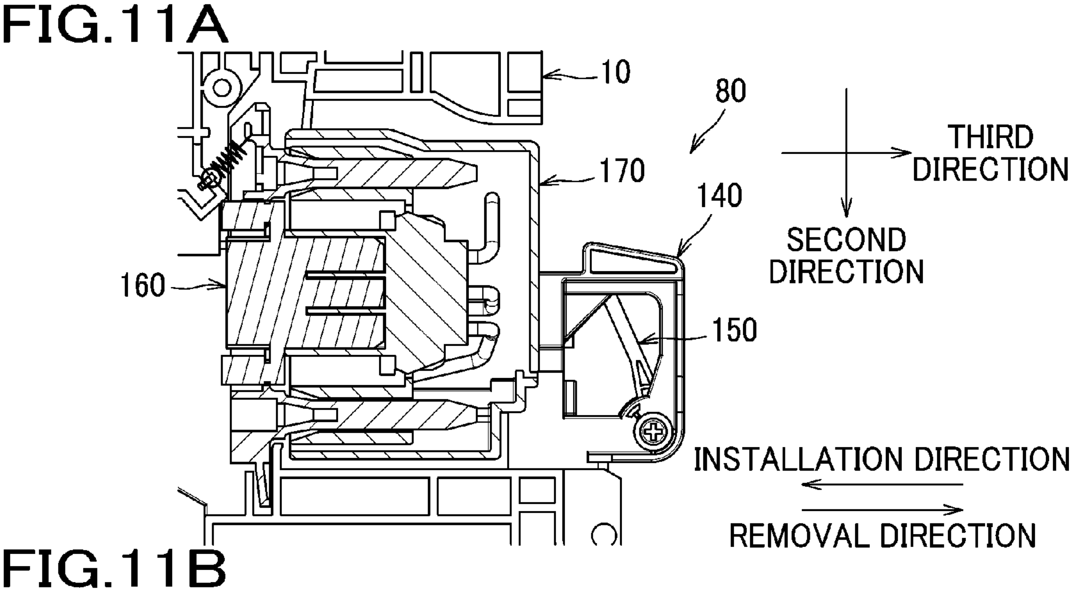
FIG. 11A is an illustration showing a state in which a housing connector and a fixing connector are connected.
Figure 11B:
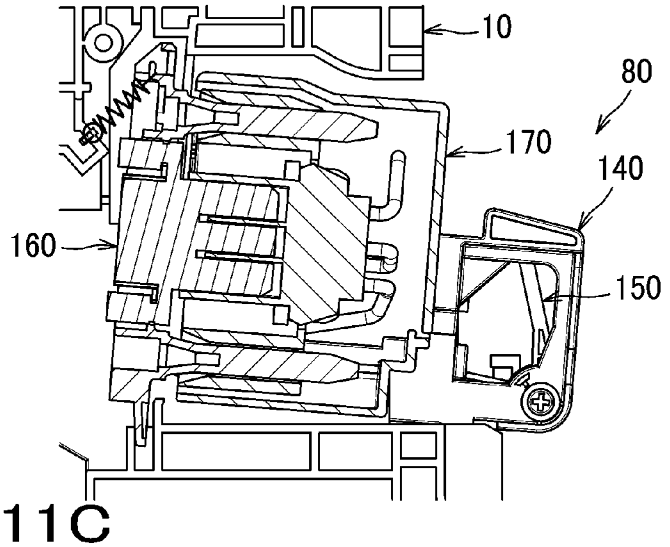
FIG. 11B is an illustration showing a state in which the fixing device is rotated from the state shown in FIG. 11A.
Figure 11C:
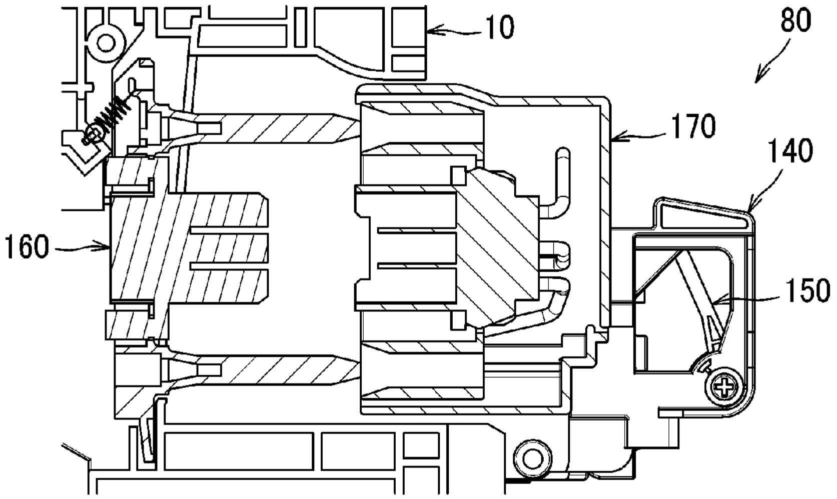
FIG. 11C is an illustration showing a state in which the fixing connector is disengaged from the housing connector.

As shown in FIGS. 11A, 11B, 11C, the housing connector 160 is rotatably held by the main housing 10. Specifically, the housing connector 160 is rotatable between the position shown in FIG. 11A and the position shown in FIG. 11B. While the housing connector 160 and the fixing connector 170 are connected to each other, the electrical connection between the housing connector 160 and the fixing connector 170 is maintained even if the housing connector 160 rotates between the position shown in FIG. 11A and the position shown in FIG. 11B. However, if the housing connector 160 and the fixing connector 170 are separated in a third direction as shown in FIG. 11C, the electrical connection between the housing connector 160 and the fixing connector 170 will not be maintained and power will not be supplied to the fixing device 80. That is, in a process of installing or removing the fixing device 80 as shown in FIG. 11B, power is suppliable to the fixing device 80 even if the fixing device 80 is tilted in a second direction from an installation position, as long as the fixing device 80 is not moved in a removal direction.

Figure 3:
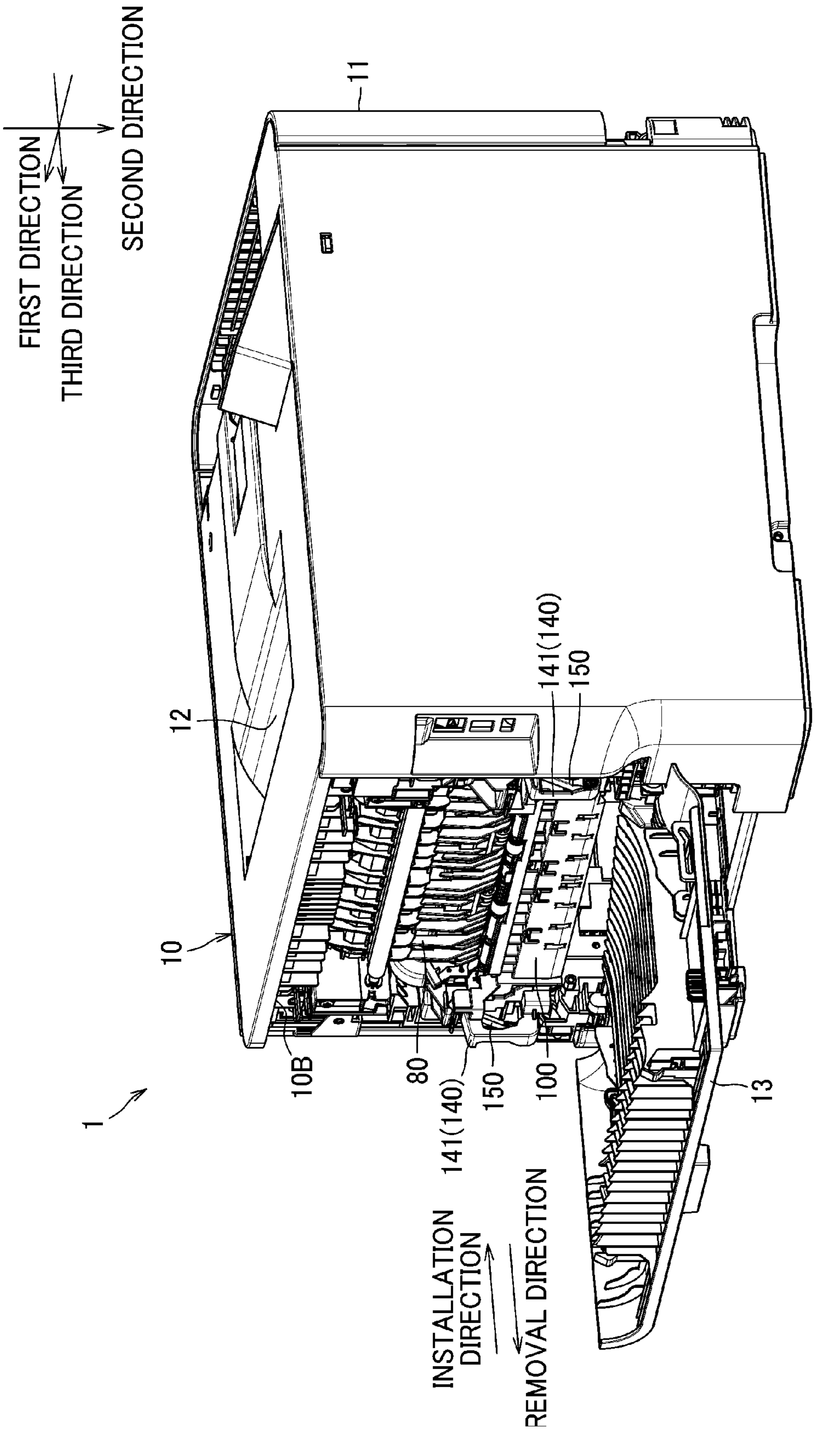
FIG. 3 is a perspective view of the image forming apparatus with a rear cover open.
Figure 4:
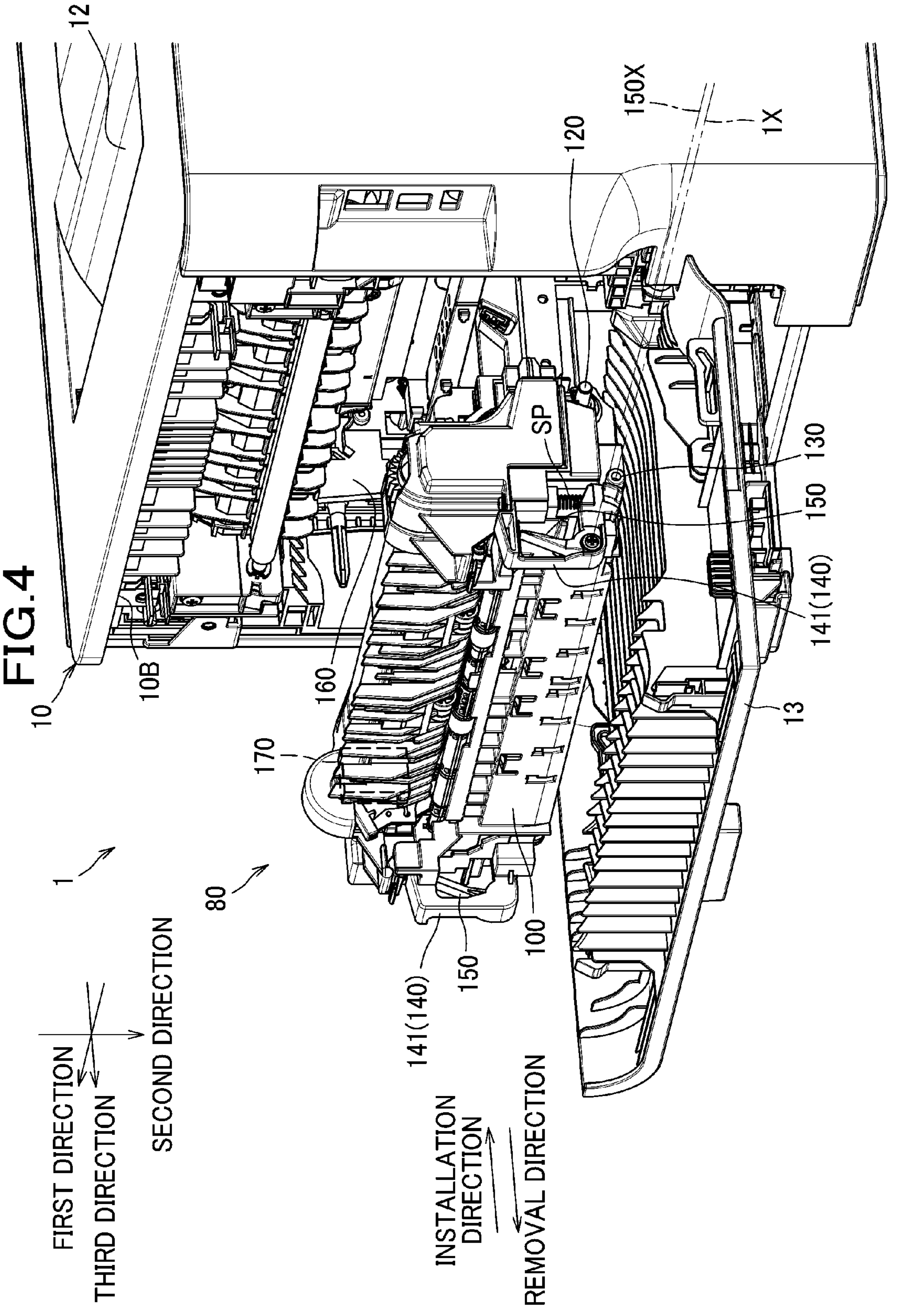
FIG. 4 is a perspective view of the image forming apparatus showing the fixing device pulled out from the state shown in FIG. 3.

As shown in FIGS. 3 and 4, the fixing device 80 is installable into and removable from the main housing 10. Specifically, the fixing device 80 is installable into and removable from the main housing 10 through the opening 10B of the main housing 10, which is opened by opening the rear cover 13. That is, the main housing 10 supports the fixing device 80 so that the fixing device 80 is installable into and removable from the main housing 10.

In the present embodiment, a first direction is parallel to an axial direction of the heating roller 81. The first direction is also parallel to a width of the sheet S. The second direction is a direction perpendicular to the first direction and parallel to the vertical direction. The third direction is a direction perpendicular to the first direction and to the second direction.

The arrows that indicate the directions in the drawings point to one side in the respective directions. In the present embodiment, one side in the first direction corresponds to the right side of the image forming apparatus 1. One side in the second direction corresponds to downward in the vertical direction. One side in the third direction corresponds to a rear side of the image forming apparatus 1.

The fixing device 80 is removed from the installation position shown in FIG. 3 toward the one side in the third direction. In the following description, the direction in which the fixing device 80 is removed is also referred to as a removal direction. As shown in FIG. 4, the fixing device 80 is installed from the one side in the third direction toward the other side in the third direction. In the following description, the direction in which the fixing device 80 is installed is also referred to as an installation direction.

As shown in FIG. 4, the fixing device 80 comprises a fixing housing 100, a first reference portion 120, a second reference portion 130, a fixed handle 140, a lever 150, and a spring SP. The fixing housing 100 has a first side facing the one side in the first direction and a second side facing the other side in the first direction. The fixing housing has a lower end portion facing the one side in the second direction and an upper end portion facing the other side in the second direction. Further, the fixing housing 100 has a first end facing the one side in the third direction and a second end facing the other side in the third direction. In FIG. 4, only the first reference portion 120, the second reference portion 130, and the spring SP disposed at the second side of the fixing housing 100 are shown.

The first reference portion 120 is a shaft having a cylindrical outer surface. The shaft protrudes outward in the first direction. The first reference portion 120 is located at the first side and the second side of the fixing housing 100. The two first reference portions 120 respectively protrude toward the one side and the other side in the first direction. The first reference portions 120 are located at the lower end portion of the fixing housing 100. The first reference portions 120 are located at the second end of the fixing housing 100. In other words, the first reference portions 120 are located at a downstream end of the fixing housing 100 in the installation direction.

The first reference portions 120 are parts that contact the main housing 10 and that are thereby located in place with respect to the main housing 10 in the second and third directions. The first reference portions 120 are located further to the other side in the third direction relative to the second reference portions 130.

The second reference portion 130 is a shaft having a cylindrical outer surface. The shaft protrudes outward in the first direction. The second reference portion 130 is located at the first side and the second side of the fixing housing 100. The two second reference portions 130 respectively protrude toward the one side and the other side in the first direction. The second reference portions 130 are located at the lower end portion of the fixing housing 100. The second reference portions 130 are located further to the one side in the second direction relative to the first reference portions 120. In the following description, an axis extending in the first direction through centers of the second reference portions 130 is referred to as a first axis 1X.

Figure 5A:
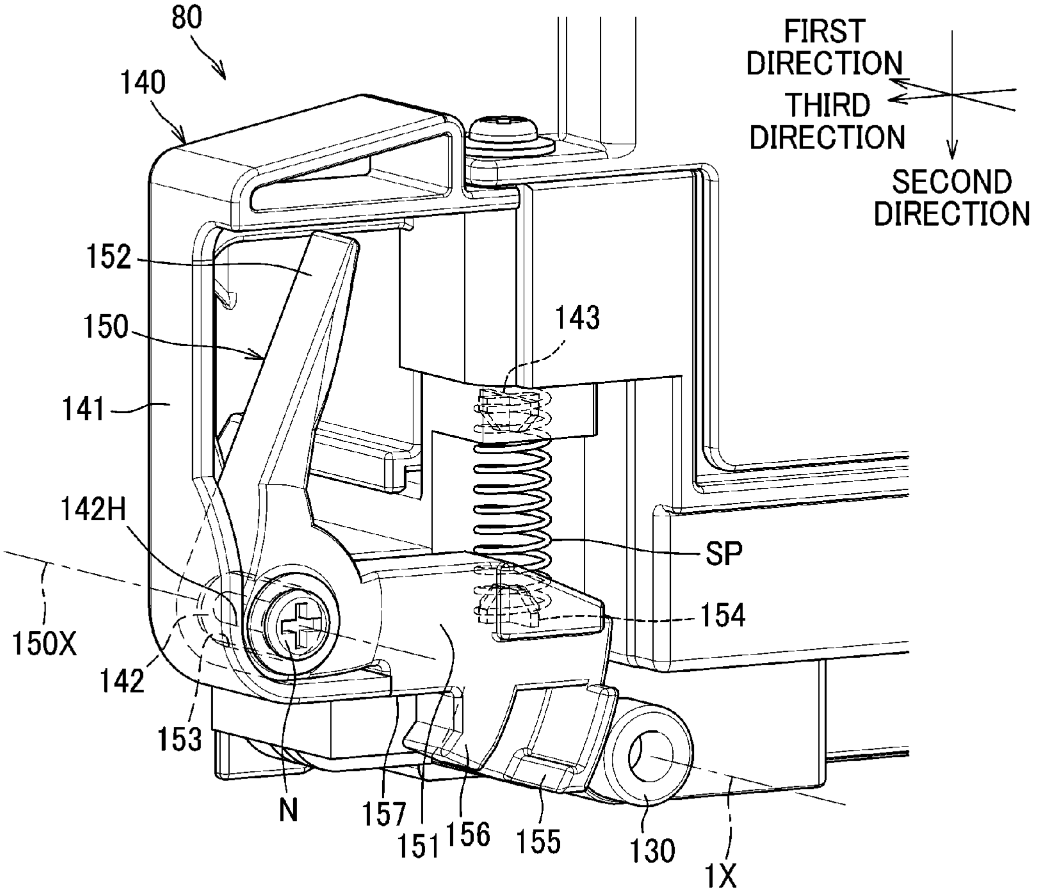
FIG. 5A is a perspective view showing a fixed handle and a lever.

The fixed handle 140 is a handle that a user grasps when installing or removing the fixing device 80. The fixed handle 140 is provided at the first side and at the second side of the fixing housing 100. The two fixed handles 140 are located at the first end of the fixing housing 100. In other words, the fixed handles 140 are located at an upstream end in the installation direction. As shown in FIG. 5A, the fixed handles 140 each comprise a grip 141, a lever holding portion 142, and a first protrusion 143. In FIG. 5A, the fixed handle 140 disposed at the second side of the fixing housing 100 is shown. A surface of the fixed handle 140 facing the other side in the second direction is inclined such that the closer to the one side in the third direction, the lower the surface.

The grip 141 is a part of the fixed handle 140 the user can grasp when removing the fixing device 80. As shown in FIG. 3, the grip 141 is exposed to the outside of the main housing 10 when the rear cover 13 is opened. Referring back to FIG. 5A, the grip 141 extends in the second direction. The lever holding portion 142 is a protrusion protruding in the first direction. The lever holding portion 142 is shaped as a cylinder, a center of which coincides with the lever axis 150X of the lever 150. The lever holding portion 142 has a screw hole 142H in which a screw N is received. The screw hole 142H is located on the lever axis 150X. The first protrusion 143 protrudes downward. The first protrusion 143 holds one end of the spring SP. The dimension of the lever holding portion 142 in the first direction is greater than the dimension of the grip 141 in the first direction.

The lever 150 is L-shaped. The lever 150 is attached to the fixed handle 140. The lever 150 is rotatable about the lever axis 150X between a first position shown in FIG. 8A and a second position shown in FIG. 8B. In this embodiment, an axial direction of the lever axis 150 X is the widthwise direction of the sheet S. The spring SP is a compression spring located between the fixed handle 140 and the lever 150. The spring SP constantly biases the lever 150 from the second position toward the first position.

Figure 5B:
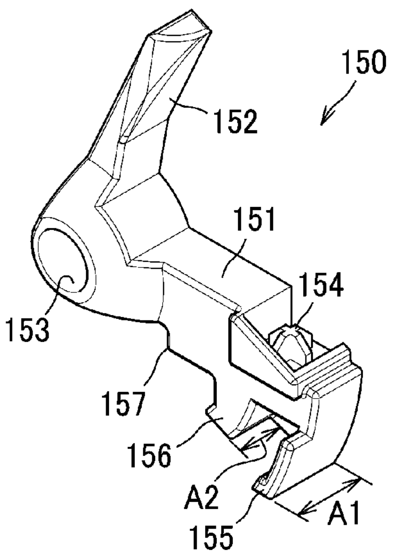
FIG. 5B is a perspective view showing the lever viewed from a direction different from FIG. 5A.
Figure 5C:
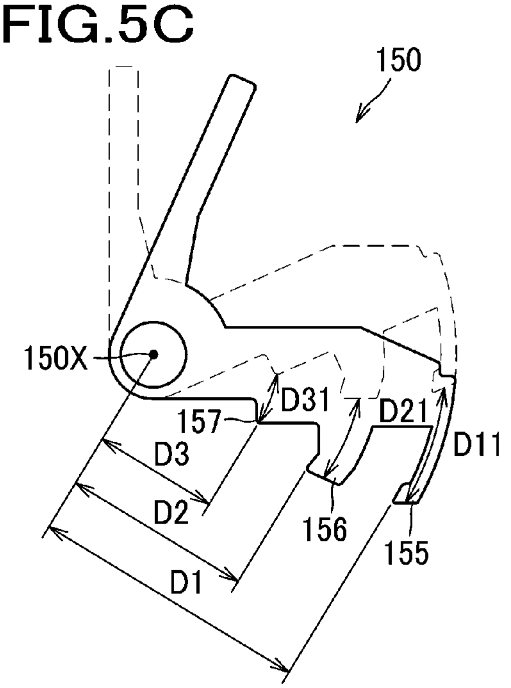
FIG. 5C is a side view of the lever.

As shown in FIGS. 5A, 5B, 5C, the lever 150 comprises a body 151, a holding portion 152, a lever hole 153, a second protrusion 154, a switch contacting portion 155, an engagement portion 157, and a to-be-pressed portion 157. The lever 150 is also provided at the first side of the fixing housing 100. However, the lever 150 at the first side of the fixing housing 100 does not comprise the switch contacting portion 155.

The body 151 extends along the third direction. The body 151 has a first end (first end portion) facing the one side in the third direction and a second end (second end portion) facing the other side in the third direction. The holding portion 152 extends along the second direction. That is, the holding portion 152 extends in a direction different from a direction in which the body 151 extends, and forms the shape of the letter L together with the body 151. The holding portion 152 is graspable when removing the fixing device 80 from the main housing 10. When the user grasps both of the grip 141 and the holding portion 152 and moves the holding portion 152 toward the grip 141, the lever 150 moves from the first position shown in FIG. 8A to the second position shown in FIG. 8B. That is, the holding portion 152 is located closer to the grip 141 when the lever 150 is in the second position than when the lever 150 is in the first position.

As shown in FIGS. 5A, 5B, 5C, the lever hole 153 is located at a portion connecting the body 151 and the holding portion 152. The lever hole 153 is a hole extending in the first direction. The lever holding portion 142 of the fixed handle 140 is received in the lever hole 153. The lever 150 is rotatably supported on the fixed handle 140 by the cylindrical lever holding portion 142 being received in the lever hole 153. By connecting the screw N to the screw hole 142H while the lever 150 is held on the fixed handle 140, the lever will not be disengaged from the fixed handle 140. The dimension of the lever hole 153 in the first direction is greater than the dimension of the holding portion 152 in the first direction.

The second protrusion 154 protrudes upward. The second protrusion 154 holds the other end of the spring SP.

The switch contacting portion 155 is a protrusion extending from the second end of the body 151 toward the one side in the second direction. That is, the switch contacting portion 155 is a protrusion protruding in a direction of rotation of the lever 150.

As shown in FIG. 8A, when the lever 150 is located in the first position, the switch contacting portion 155 is located in a switch hole 15 which will be described later. When the switch contacting portion 155 is received in the switch hole 15, the switch contacting portion 155 is contactable with the interlock switch 87.

As shown in FIG. 8A, if the fixing device 80 is installed in the main housing 10 and the holding portion 152 is not grasped, the lever 150 is located in the first position and the switch contacting portion 155 is in contact with the interlock switch 87, causing the interlock switch 87 to assume the on-state.

As shown in FIG. 8B, if the fixing device 80 is installed in the main housing 10 and the holding portion 152 is grasped, the lever 150 rotates from the first position to the second position, separating the switch contacting portion 155 from the interlock switch 87 and causing the interlock switch 87 to assume the off-state.

The engagement portion 156 is a protrusion that extends from the second end portion of the body 151 toward the one side in the second direction. That is, the engagement portion 156 is a protrusion protruding in the direction of rotation of the lever 150. The engagement portion 156 is located further to the one side in the third direction, i.e., upstream in the installation direction, relative to the switch contacting portion 155. In this embodiment, the engagement portion 156 is shaped as a hook which end is bent in the removal direction.

As shown in FIG. 8A, when the lever 150 is located in the first position, the engagement portion 156 is received in an engagement hole 16 which will be described later. When the engagement portion 156 is located in the engagement hole 16, the engagement portion 156 is engageable with the main housing 10. When the engagement portion 156 is engaged with the main housing 10, the engagement portion 156 restricts the fixing device 80 from being disengaged from the main housing 10.

As shown in FIG. 8B, when the lever 150 is located in the second position, the engagement portion 156 is not engaged with the main housing 10 and does not restrict the fixing device 80 from being disengaged from the main housing 10.

As shown in FIG. 5C, the distance D1 from the lever axis 150X to the switch contacting portion 155 is greater than the distance D2 from the lever axis 150X to the engagement portion 156 (D2<D1). That is, when the lever 150 rotates, the amount of travel D11 of the switch contacting portion 155 is greater than the amount of travel D21 of the engagement portion 156 (D21<D11).

The to-be-pressed portion 157 is located on a lower side of the body 151. The to-be-pressed portion 157 is located between the lever axis 150X and the switch contacting portion 155 in the installation direction. The to-be-pressed portion 157 is located between the lever axis 150X and the engagement portion 156 in the installation direction. Further, the to-be-pressed portion 157 is located between the first axis 1X and the lever axis 150X. As shown in FIG. 10B, the to-be-pressed portion 157 is a portion that is pressed by the main housing 10 in a process of the fixing device 80 being removed from the installation position, and is capable of causing the lever 150 to rotate from the first position toward the second position. That is, when the to-be-pressed portion 157 is pressed by a pressing portion 10C of the main housing 10, the lever rotates from the first position to the second position. It is to be understood that the pressing portion 10C is a surface opposed to the to-be-pressed portion 157 with the fixing device 80 installed in the main housing 10.

As shown in FIG. 5C, the distance D1 from the lever axis 150X to the switch contacting portion 155 is greater than the distance D3 from the lever axis 150X to the to-be-pressed portion 157 (D3<D1). That is, when the lever 150 rotates, the amount of travel D11 of the switch contacting portion 155 is greater than the amount of travel D31 of the to-be-pressed portion 157 (D31<D11).

Figure 6A:
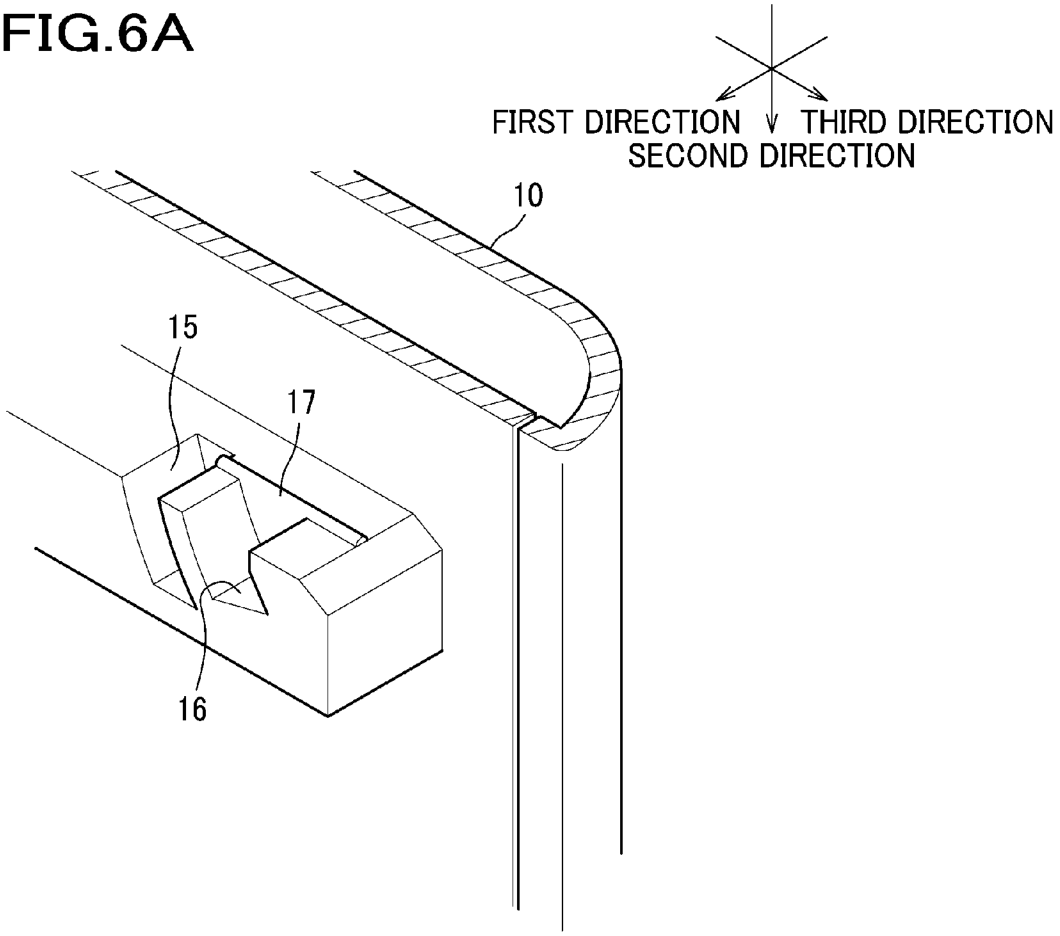
FIG. 6A is a perspective showing a structure on an inner wall surface of the main housing.
Figure 6B:
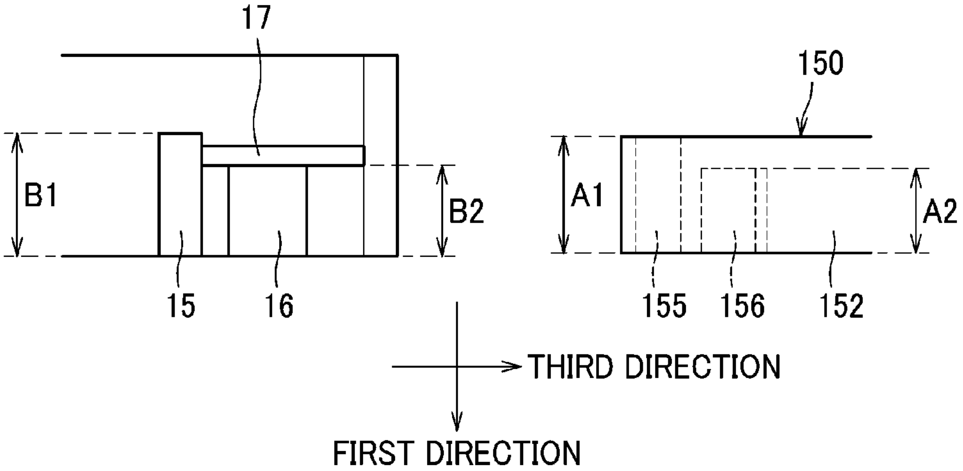
FIG. 6B is a partial illustration of the structure and the lever from above.

As shown in FIGS. 6A, 6B, the main housing 10 has a switch hole 15, an engagement hole 16, and a rail 17. The switch hole 15, the engagement hole 16, and the rail 17 are located on an inner wall surface of the main housing 10.

The switch hole 15 is a hole in which the switch contacting portion 155 is received when the fixing device 80 is installed in the main housing 10 with the lever 150 located in the first position. The switch hole 15 has a rectangular opening. The switch hole 15 extends in the direction of rotation of the lever 150.

The engagement hole 16 is a hole in which the engagement portion 156 is received when the fixing device 80 is installed in the main housing 10 with the lever 150 located in the first position. The engagement hole 16 extends in the direction of rotation of the lever 150. The engagement hole 16 has a depth shallower than a depth of the switch hole 15. The engagement hole 16 restricts the fixing device 80 from being disengaged from the main housing 10 when the engagement portion 16 is received in the engagement hole 16.

The dimension B2 of the engagement hole 16 is greater than the dimension A2 of the engagement portion 156 in the first direction. The dimension B2 of the engagement hole 16 is smaller than the dimension B1 of the switch hole 15 in the first direction. The dimension B2 of the engagement hole 16 is smaller than the dimension A1 of the switch contacting portion 155 in the first direction.

The rail 17 guides the switch contacting portion 155 so that the switch contacting portion 155 does not get caught in the engagement hole 16 in the process of installing or removing the fixing device 80. Specifically, the rail 17 is located at an edge of an opening of the engagement hole 16 at the other side in the first direction. The rail 17 extends from a position upstream of the engagement hole 16 to a position downstream of the engagement hole 16 in the installation direction. The rail 17 protrudes further upward relative to the opening of the engagement hole 16.

Figure 7A:
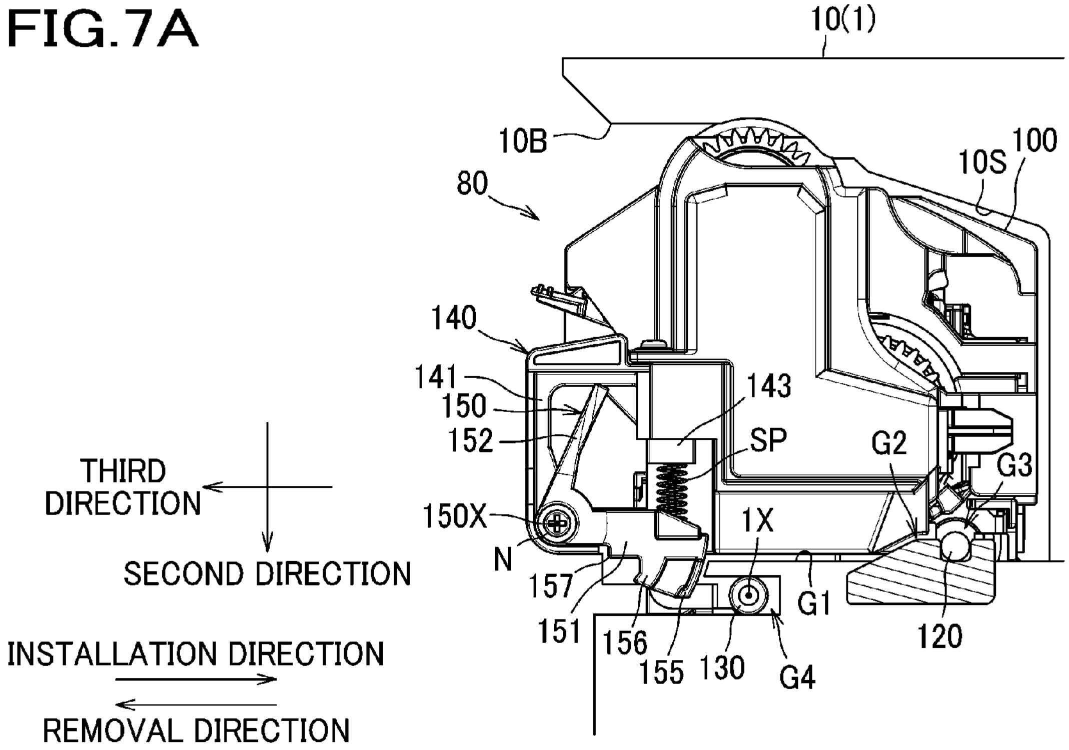
FIG. 7A is an illustration showing the fixing device located in an installation position.
Figure 7B:
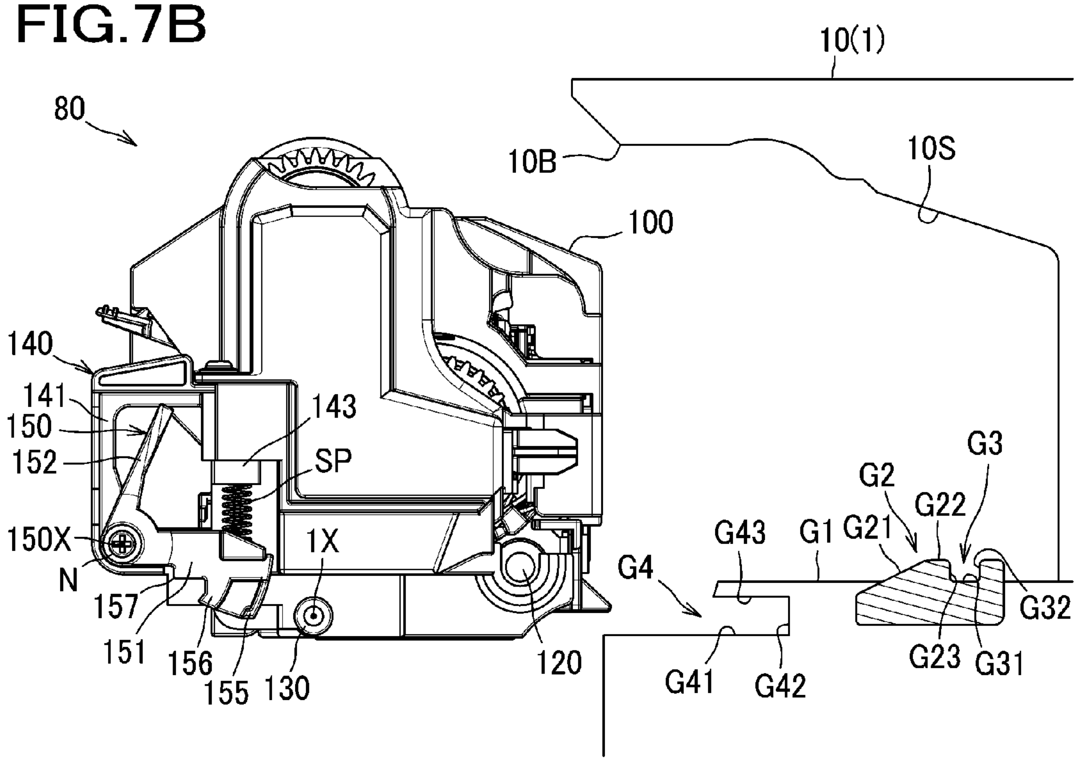
FIG. 7B is an illustration showing the fixing device removed from the main housing.

As shown in FIGS. 7A, 7B, the main housing 10 comprises a guide surface G1, a protrusion G2, a first recess G3, and a second recess G4.

The guide surface G1 is a surface for guiding the first reference portion 120 of the fixing device 80. The guide surface G1 is perpendicular to the second direction. The guide surface G1 contacts the first reference portion 120 from below in the process of installing or removing the fixing device 80.

The protrusion G2 protrudes upward from the guide surface G1. The protrusion G2 has a first end portion at the one side in the third direction and a second end portion at the other side in the third direction. As shown in FIG. 7B, the protrusion G2 has an inclined surface G21, an upper end surface G22, and a reference surface G23.

The inclined surface G21 is located at the first end portion of the protrusion G2. That is, the inclined surface G21 is located at an upstream end portion of the protrusion G2 in the installation direction of the fixing device 80. The inclined surface G21 is inclined with respect to the guide surface G1. Specifically, the inclined surface G21 is inclined such that the closer to a downstream side in the installation direction, the higher the inclined surface G21.

The upper end surface G22 extends from a downstream end of the inclined surface G21 in the installation direction toward the downstream side in the installation direction. The reference surface G23 extends downward from a downstream end of the upper end surface G22 in the installation direction. The reference surface G23 is perpendicular to the third direction. The reference surface G23 is located downstream of the protrusion G2 in the installation direction. The reference surface G23 is in contact with the first reference portion 120 while the fixing device 80 is installed in the main housing 10.

The first recess G3 is recessed downward from the upper end surface G22 of the protrusion G2. In a state where the fixing device 80 is installed in the main housing 10, the first reference portion 120 is located in the first recess G3. The first recess G3 has the reference surface G23 described above, a second reference surface G31, and a stopper surface G32.

The second reference surface G31 intersects the reference surface G23. Specifically, the second reference surface G31 is perpendicular to the reference surface G23. The second reference surface G31 extends downstream in the installation direction from a lower end of the reference surface G23. The second reference surface G31 is perpendicular to the second direction. The second reference surface G31 is in contact with the first reference portion 120 while the fixing device 80 is installed in the main housing 10.

The stopper surface G32 extends upward from a downstream end of the second reference surface G31 in the installation direction. The stopper surface G32 contacts the first reference portion 120 at the time of installation of the fixing device 80 and restrains the first reference portion 120 from moving downstream in the installation direction.

The second recess G4 is a recess in which the second reference portion 130 is located while the fixing device 80 is installed in the main housing 10. The second recess G4 opens upstream in the installation direction. The second recess G4 has a first restriction surface G41, a bottom surface G42, and a second restriction surface G43.

The first restriction surface G41 is in contact with the second restriction portion 130 to restrain the second reference portion 130 from moving downward while the fixing device 80 is installed in the main housing 10. The first restriction surface G41 is in contact with the second reference portion 130 from below while the fixing device 80 is installed in the main housing. The first restriction surface G41 extends further upstream relative to the second restriction surface G43 in the installation direction. The first restriction surface G41 has an upstream end and a downstream end in the installation direction.

The bottom surface G42 extends upward from the downstream end of the first restriction surface G41. The second restriction surface G43 extends upstream in the installation direction from the upper end of the bottom surface G42. The second restriction surface G43 is in contact with the second reference portion 130 and restrains the second reference portion 130 from moving upward while the fixing device 80 is installed in the main housing 10.

In a state where the fixing device 80 is installed in the main housing 10, the second reference portion 130 is located between the first restriction surface G41 and the second restriction surface G43. The first restriction surface G41 and the second restriction surface G43 are surfaces that stop the fixing device 80 installed in the main housing 10 from rotating about the first reference portion 120.

Next, the operation of installing and removing the fixing device 80 will be described. First, the process of grasping the lever 150 and removing the fixing device 80 from the main housing 10 will be described.

In the event that the lever 150 is to be removed by grasping the fixing device 80, the user grasps the holding portion 152 of the lever 150 in the state shown in FIG. 8A and rotates the lever 150 from the first position to the second position in the counterclockwise direction of FIG. 8A.

As the lever 150 is rotated toward the second position, the switch contacting portion 155 moves upward causing the interlock switch 87 to assume the off-state and thereby shut off power to the heater 81A. Once the lever 150 is rotated to the second position as shown in FIG. 8B, the switch contacting portion 155 is located outside the switch hole 15. Similarly, once the lever 150 is rotated to the second position, the engagement portion 156 is located outside the engagement hole 16. The fixing device 80 is thereby disengaged from the main housing 10. At this time, the housing connector 160 and the fixing connector 170 are connected as shown in FIG. 11A.

Figure 9A:
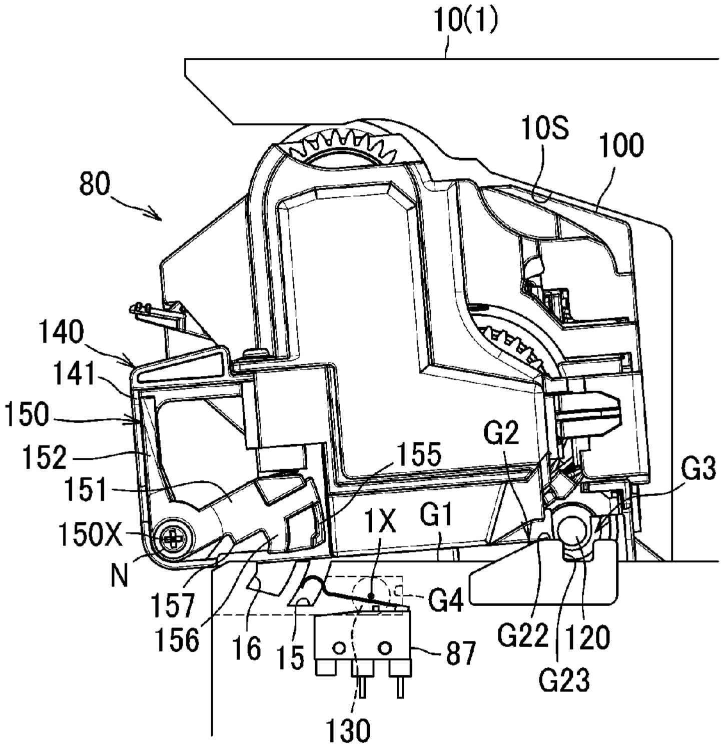
FIG. 9A is an illustration showing the fixing device rotated from the installation position about a first axis with the lever located in the second position.

Next, the user pulls the grip 141 and the holding portion 151 downward in the state shown in FIG. 8B while grasping the grip 141 and the holding portion 151. As a result, as shown in FIG. 9A, the fixing device 80 rotates in the counterclockwise direction about the first axis 1X. At this time, the fixing device 80 rotates in a direction in which the lever axis 150X moves downward and the first reference portion 120 moves upward.

When the user rotates the fixing device 80 in the counterclockwise direction, the first reference portion 120 moves out of the first recess G3, whereby the first reference portion 120 is not restricted by the reference surface G23 allowing the fixing device 80 to move in the removal direction. At this time, as shown in FIG. 11B, the housing connector 160 and the fixing connector 170 tilt in the second direction with respect to the main housing 10, but the electrical connection of the housing connector 16 and the fixing connector 170 is maintained.

In this embodiment, the direction in which the fixing device 80 rotates in the process of removing the fixing device 80 from the installation position is the same as the direction in which the lever 150 rotates from the first position to the second position. In other words, when the lever rotates from the first position to the second position, the holding portion 152 moves in a direction that is the same as the direction in which the fixing device 80 is removed.

Figure 9B:
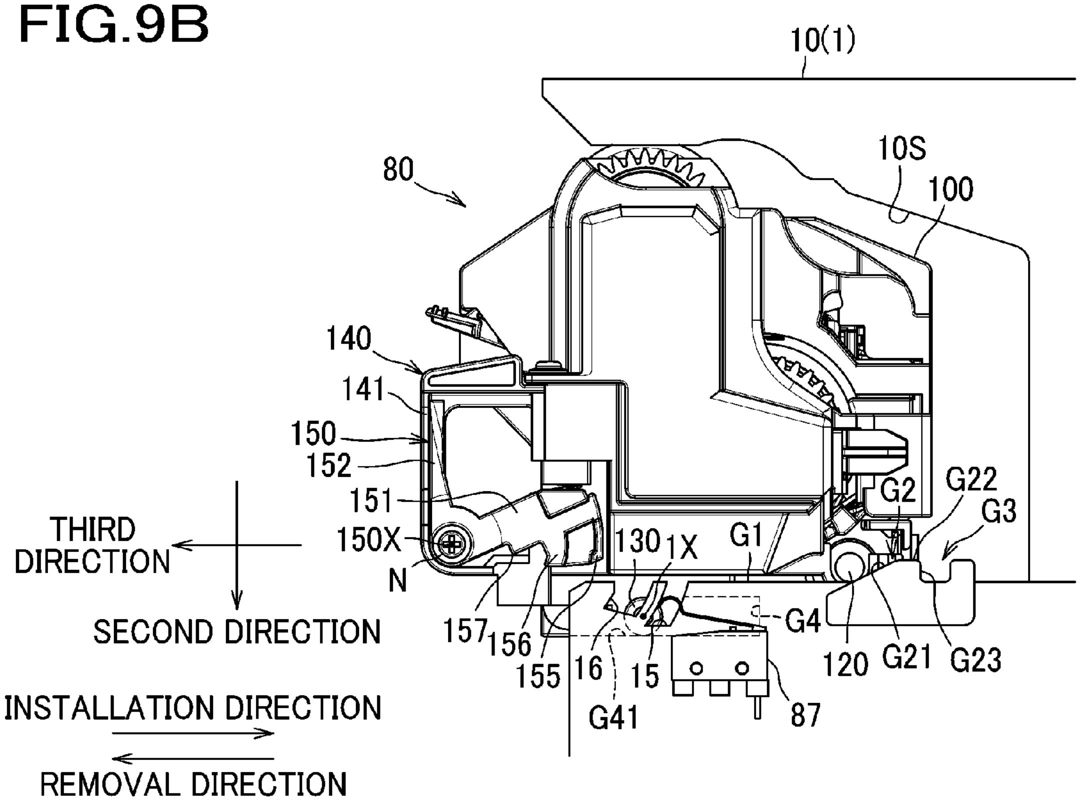
FIG. 9B is an illustration showing the fixing device moved in a removal direction from the state shown in FIG. 9A.

Next, in the state shown in FIG. 9A, the user pulls the grip 141 and the holding portion 151 in the removal direction while grasping the grip 141 and the holding portion 151. As a result, as shown in FIG. 9B, the fixing device 80 moves in the removal direction and the first reference portion 120 contacts the inclined surface G21. As the first reference portion 120 is guided by the inclined surface G21, the fixing device 80 rotates in the clockwise direction. At this time, as shown in FIG. 11C, the housing connector 160 and the fixing connector 170 are disconnected.

Figure 10A:
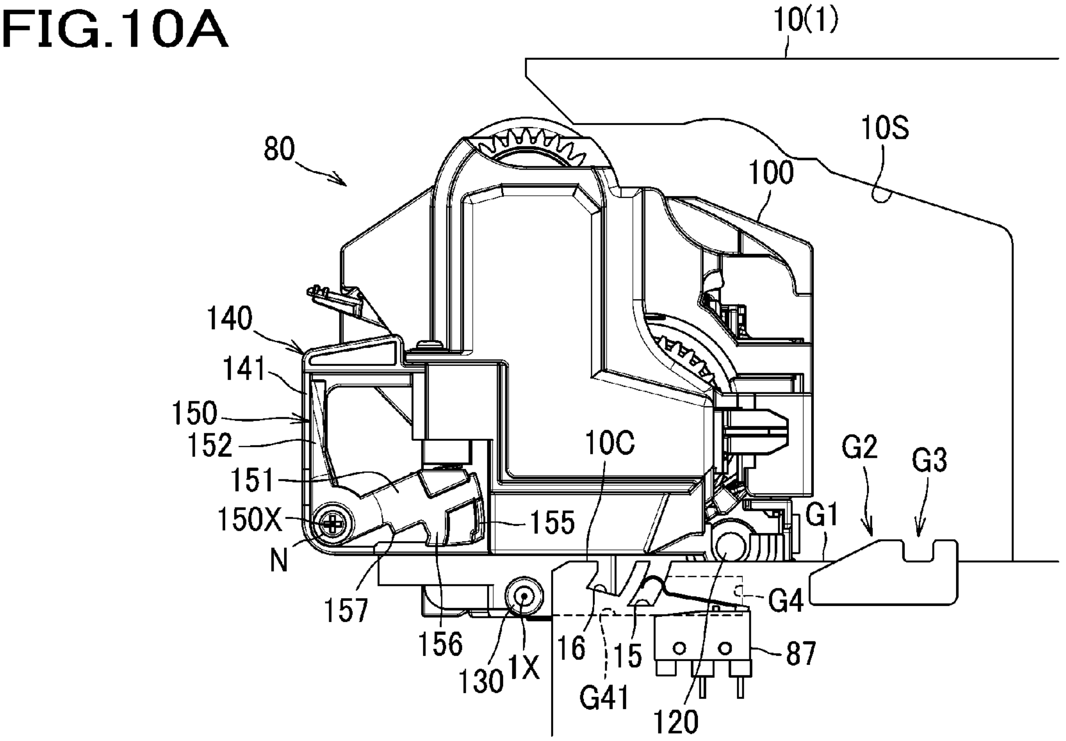
FIG. 10A is an illustration showing the fixing device moved further in the removal direction from the state shown in FIG. 9B.
Figure 10B:
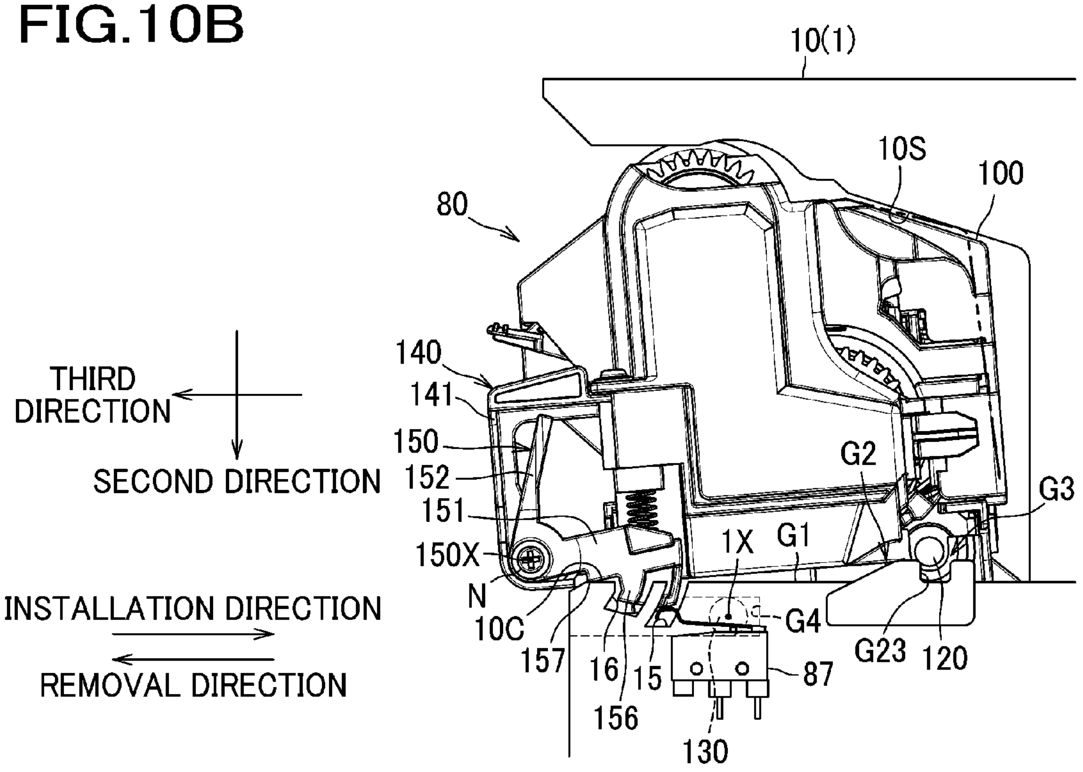
FIG. 10B is an illustration showing the fixing device rotated from the installation position about the first axis with the lever located in the first position.

As the grip 141 is further pulled in the removal direction as shown in FIG. 10A, the fixing device 80 moves further in the removal direction, and the first reference portion 120 contacts the guide surface G1. The first reference portion 120 is guided by the guide surface G1 and the fixing device 80 is moved out of the main housing.

Next, the operation in an attempt to remove the fixing device 80 from the main housing 10 without grasping the lever 150 will be described. This operation occurs, for example, when the fixing device 80 is pulled downward to remove a sheet jammed in the fixing device 80 without an intention to remove the fixing device 80.

If the user pulls the grip 141 of the fixed handle 140 downward without grasping the holding portion 152 of the lever 150 in the state shown in FIG. 8A, the fixing device 80 rotates in the counterclockwise direction about the first axis 1X as shown in FIG. 10B. At this time, the fixing device 80 rotates in a direction in which the lever axis 150X moves downward and the first reference portion 120 moves upward. This rotation causes a part of the first reference portion 120 to move out of the first recess G3. However, since the engagement portion 156 is still received in the engagement hole 16, the fixing device 80 cannot move in the removal direction.

It is to be understood that in a state where the first reference portion 120 is located outside of the first recess G3, a part of the fixing frame 100 shown by a chain double-dashed line in FIG. 10B contacts a part 10S of the main housing 10. Thus, the fixing device 80 is not allowed to rotate any further in the counterclockwise direction.

When the fixing device 80 rotates from the installation position about the first axis 1X in the process removing the fixing device 80 from the installation position, the to-be-pressed portion 157 of the lever 150 is pressed by the pressing portion 10C of the main housing 10 causing the lever 150 to rotate. The lever 150 does not move to the second position, but is located between the first position and the second position. This causes a part of the switch contacting portion 155 received in the switch hole 15 to move out of the switch hole 15. As a result, the interlock switch 87 assumes an off-state and power to the heater 81A is shut off. At this time, as shown in FIG. 11B, the housing connector 160 and the fixing connector 170 are connected. As described above, the fixing device 80 cannot be disengaged from the main housing 10 in an attempt to remove the fixing device 80 without grasping the lever 150.

Next, the operation of attaching the fixing device 80 to the main housing 10 will be described.

As shown in FIG. 10A, when the fixing device 80 is to be attached to the main housing 10, the first reference portion 120 is contacted and guided by the guide surface G1.

As the fixing device 80 moves in the installation direction from the state shown in FIG. 10A, the second reference portion 130 enters the second recess G4 and contacts the first restriction surface G41 as shown in FIG. 9B, whereby the fixing device 80 is guided by the first restriction surface G41. When the first reference portion 120 contacts the inclined surface G21, the first reference portion 120 moves diagonally along the inclined surface G21 upward and downstream in the installation direction. As the first reference portion 120 is guided by the inclined surface G21, the fixing device 80 rotates in the counterclockwise direction. The fixing device 80 is thereby inserted into the main housing 10 in a posture, as shown in FIG. 9A, in which a downstream surface of the fixing device 80 in the installation direction faces obliquely upward.

The first reference portion 120 is guided by the inclined surface G21 and then guided by the upper end surface G22 in a direction parallel to the third direction. After the first reference portion 120 moves past the upper end surface G22 as shown in FIG. 8B, the first reference portion 120 enters the first recess G3 by gravity. In this way, the fixing device 80 is installed in the main housing 10 by a first process of sliding the fixing device 80 in the installation direction and a second process of rotating the fixing device 80 about the first axis 1X.

According to the above, the following advantageous effects can be obtained by the present embodiment.

In the event that the fixing device 80 is to be removed from the main housing 10, the user grasps the holding portion 152 of the lever 150 to rotate the lever 150 from the first position to the second position whereby the switch contacting portion 155 of the lever 150 is separated from the interlock switch 87. Thus, the user can remove the fixing device 80 with power to the heater 81A shut off by grasping the holding portion 152. If the fixing device 80 were to be removed from the main housing 10 while power is being provided to the heater 81A, an electrical discharge may occur between the housing connector 160 and the fixing connector 170. By removing the fixing device 80 with power to the heater 81A shut off, the occurrence of an electrical discharge can be reduced.

Since the lever 150 includes the engagement portion 156, both of the switch contacting portion 155 and the engagement portion 156 can be moved by grasping the lever. Thus, operation of the interlock switch 87 and disengagement of the fixing device 80 can be performed by one operation.

Since the switch contacting portion 155 is located farther, than the engagement portion 156, from the lever axis 150X, the amount of travel D11 of the switch contacting portion 155 is greater than the amount of travel D21 of the engagement portion 156 when the lever 150 rotates from the first position to the second position. Thus, a sufficient amount of travel of the switch contacting portion 155 for operating the interlock switch 87 can be obtained more easily when the lever 150 rotates from the first position to the second position.

Since the dimension B2 of the engagement hole 16 is smaller than the dimension A1 of the switch contacting portion 155 in the first direction, the switch contacting portion 155 can be restrained from being received in the engagement hole 16.

Since the direction in which the lever 150 is rotated to disengage the engagement portion 156 from the main housing 10 is the same as the direction in which the fixing device 80 is rotated to disengage the fixing device 80, the lever 150 can be operated more easily compared to an alternative configuration in which the lever 150 is rotated in the opposite direction.

Since the holding portion 152 of the lever 150 is located closer to the grip 141 when the lever 150 is located in the second position than when the lever 150 is located in the first position, the holding portion 152 of the lever 150 and the grip 141 of the fixed handle 140 can be easily held at the same time. Further, by grasping the holding portion 152 and the grip 141 at the same time, the rigidity of the lever 150 can be supplemented.

Since the axial direction of the lever axis 150X of the lever 150 is the widthwise direction of the sheet S, the operation of the lever 150 is easier than an alternative configuration in which the axial direction of the lever axis 150X is different from the widthwise direction of the sheet S.

The to-be-pressed portion 157 of the lever 150, pressed by the main housing 10 in the process of the fixing device 80 being removed from the installation position, is located between the lever axis 150X and the switch contacting portion 155. Thus, the amount of travel D11 of the switch contacting portion 155 becomes greater than the amount of travel D31 of the to-be-pressed portion 157 when the to-be-pressed portion 157 is pressed by the main housing 10. The interlock switch 87 more likely assumes the off-state when the amount of travel D11 of the switch contacting portion 155 is greater than the amount of travel D31 of the to-be-pressed portion 157 compared to when the amount of travel D11 is less than the amount of travel D31. Therefore, power to the heater 81A can be shut off in the process of the fixing device 80 being removed from the installation position.

Since the lever 150 rotates in response to the to-be-pressed portion 157 being pressed by the main housing 10, the interlock switch 87 can assume the off-state more easily.

Since the direction of rotation of the fixing device 80 and the direction of rotation of the lever 150 is the same in the process of removing the fixing device 80 from the installation position, the fixing device 80 can be easily rotated while rotating the lever 150 when the fixing device 80 is disengaged.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below wherein components similar to the above-described configuration will be identified by the same reference characters and descriptions thereof will be omitted.

Although the switch contacting portion 155 and the engagement portion 156 are aligned in the installation direction in the above-described embodiment, the switch contacting portion may be located at a position different from that of the engagement portion in the installation direction.

Figure 12A:
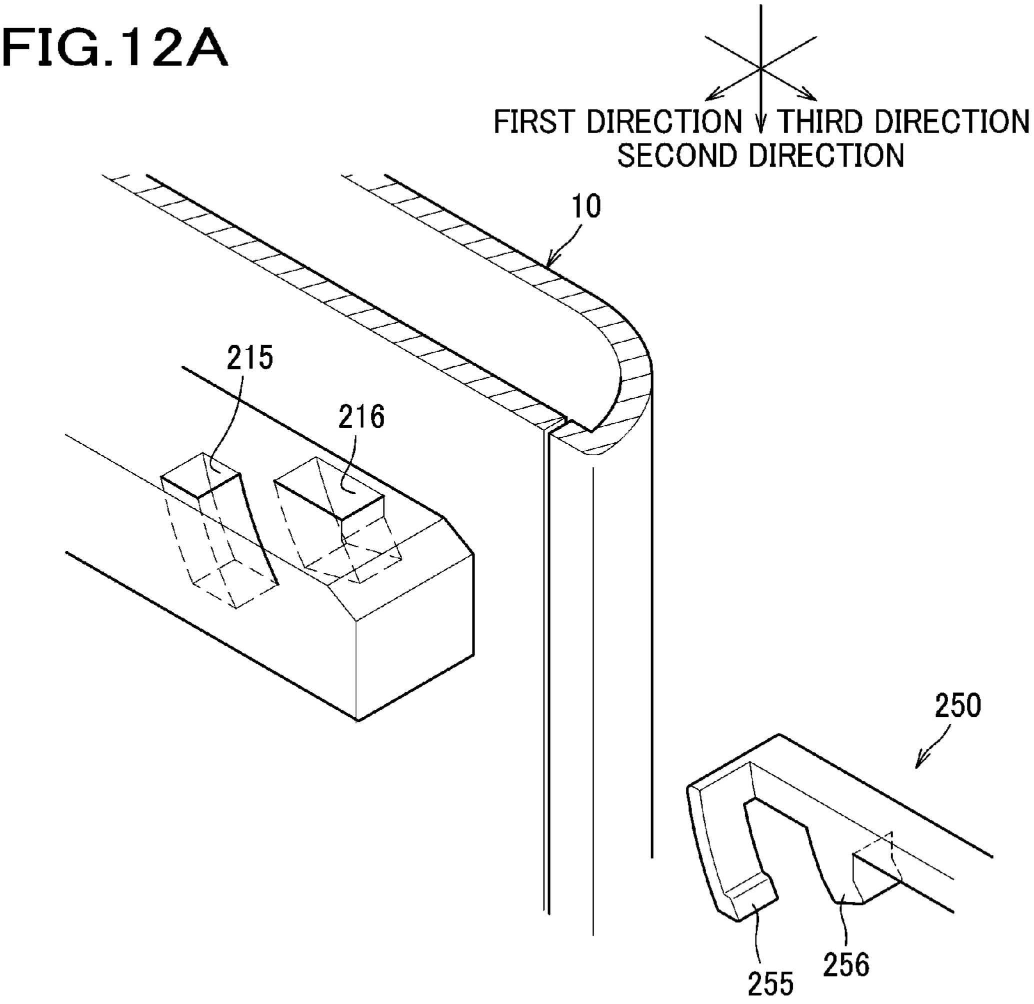
FIG. 12A is a perspective view of an alternative configuration showing a structure on an inner wall surface of the main housing and a lever.
Figure 12B:
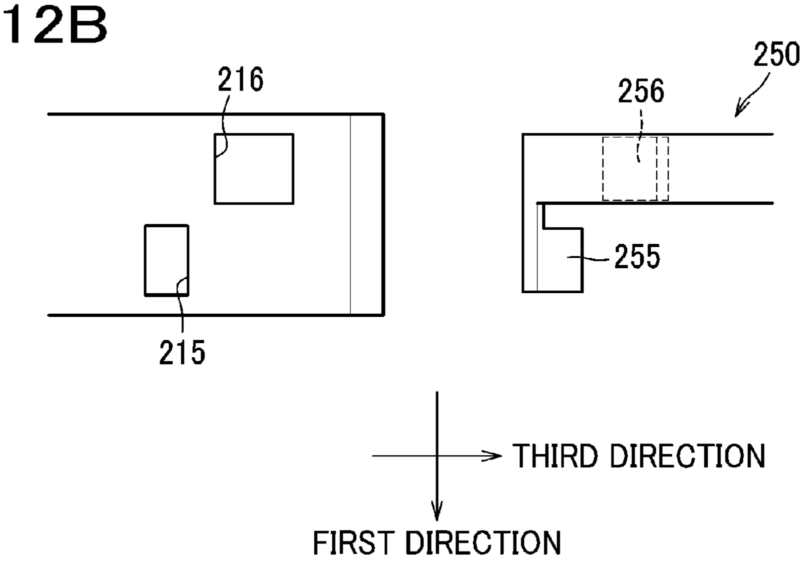
FIG. 12B is a partial illustration of the structure and the lever from above.
Figure 13:
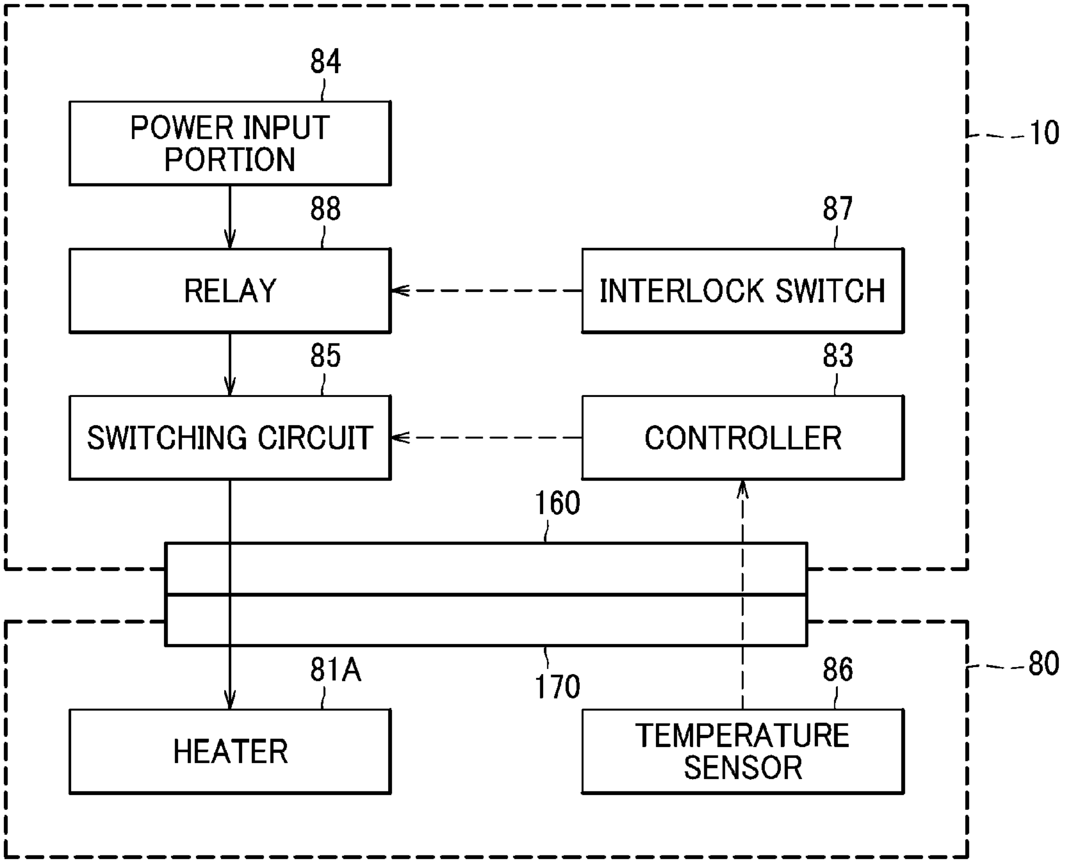
FIG. 13 is a block diagram of an alternative configuration showing electrical connections between components of the image forming apparatus.

For example, a switch contacting portion 255 of a lever 250 shown in FIGS. 12A, 12B, is located at a position different from that of an engagement portion 256 in the installation direction. Similarly, a switch hole 215 is located at a position different from that of an engagement hole 216 in the installation direction. According to this configuration, similar to the above-described embodiment, the switch contacting portion 255 can be restrained from being received in the engagement hole 216.

Although the controller 83 is configured to supply power to the heater 81A if the interlock switch 87 is in an electrically-continuous state and not to supply power to the heater 81A if the interlock switch 87 is in an electrically-noncontinuous state in the above-described embodiment, the controller may be configured to supply power to the heater 81A if the interlock switch 87 is in an electrically-noncontinuous state and not to supply power to the heater 81A if the interlock switch 87 is in an electrically-continuous state.

Although the controller 83 switches the relay 88 to the connected state if the interlock switch 87 is in the on-state and switches the relay 88 to the shut-off state if the interlock switch 87 is in the off-state in the above-described embodiment, the relay 88 may be configured to be switched to the connected state and to the shut-off state by the interlock switch 87 and not via the controller 83. According to this configuration, power will be supplied to the heater 81A if the interlock switch 87 is in the on-state and power will not be supplied to the heater 81A if the interlock switch 87 is in the off-state, without the controller 83 determining whether or not to supply power to the heater 81A based on the state of the interlock switch 87.

Although the fixed handle 140 and the lever 150 are located at the first side and the second side of the fixing device 80 in the above-described embodiment, only one fixed handle 140 and only one lever 150 may be provided. The fixed handle 140 and the lever 150 may be located at a central portion of the fixing device 80 in the first direction.

Although the engagement portion 156 is shaped as a hook which end is bent in the removal direction in the above-described embodiment, the engagement portion may be a protrusion such as a cylinder, a recess, or a hole. If the engagement portion is a recess or a hole, a convex portion or a protrusion, corresponding to engagement portion formed as the recess or the hole, may be formed on the main housing 10.

The image forming apparatus is not limited to a multicolor printer and may be any of a monochrome printer, a multifunctional device, or a copying machine. Although an electrophotographic image forming apparatus is illustrated in the above-described embodiment, the image forming apparatus may be an ink-jet image forming apparatus.

The elements described in the above embodiment and its modified examples may be implemented selectively and in combination.

What is claimed is:

1. An image forming apparatus, comprising:
- a main housing;
- a process unit configured to form a toner image on a sheet; and
- a fixing device installable in and removable from an installation position in the main housing and configured to fix the toner image on the sheet, the fixing device comprising:
  - a heating member including a heater;
  - a pressure member configured to nip the sheet in combination with the heating member; and
  - a lever rotatable about a lever axis between a first position and a second position, and
  - a fixed handle located at an upstream end of the fixing device in an installation direction in which the fixing device is installed into the main housing,
- wherein the main housing comprises an interlock switch configured to allow power to be supplied to the heater in an on-state and to shut off power to the heater in an off-state,
- wherein the fixed handle includes:
  - a grip graspable when the fixing device is to be removed from the main housing, the grip being an upstream part of the fixed handle in the installation direction, and extending in a direction that crosses the installation direction; and
  - a lever supporting portion configured to support the lever in a manner that allows the lever to rotate about the lever axis,
- wherein the lever includes:
  - a holding portion graspable when the fixing device is to be removed from the main housing, the holding portion being located closer to the grip when the lever is located in the second position than when the lever is located in the first position; and
  - a switch contacting portion contactable with the interlock switch,
- wherein in a case where the fixing device is installed in the installation position in the main housing and the lever is located at the first position, the switch contacting portion is in contact with the interlock switch to set the interlock switch to the on-state, and
- wherein in a case where the fixing device is installed in the installation position in the main housing and the lever is located at the second position, the switch contacting portion is separated from the interlock switch to set the interlock switch to the off-state.

2. The image forming apparatus according to claim 1, wherein in a case where the fixing device is installed in the installation position in the main housing and the holding portion is not grasped, the lever is located at the first position, and in a case where the fixing device is installed in the installation position in the main housing and the holding portion is grasped, the lever is located at the second position.

3. The image forming apparatus according to claim 1, wherein the lever includes an engagement portion configured to engage the main housing and restrict the fixing device from being disengaged from the main housing when the lever is located in the first position.

4. The image forming apparatus according to claim 3, wherein a distance from the lever axis to the switch contacting portion is greater than a distance from the lever axis to the engagement portion.

5. The image forming apparatus according to claim 4, wherein the switch contacting portion is a protrusion protruding in a direction of rotation of the lever, the engagement portion is a protrusion protruding in the direction of rotation of the lever and located upstream of the switch contacting portion in the installation direction, the main housing has an engagement hole configured to receive the engagement portion and to restrict the fixing device from being disengaged from the main housing when the engagement portion is received in the engagement hole, and a dimension of the engagement hole in an axial direction of the lever axis is smaller than a dimension of the switch contacting portion in the axial direction.

6. The image forming apparatus according to claim 3, wherein the switch contacting portion is located at a position different from a position in which the engagement portion is located in an axial direction of the lever axis.

7. The image forming apparatus according to claim 1, wherein when the lever is moved from the first position to the second position, the holding portion moves in a direction that is the same as a direction in which the fixing device is removed from the installation position in the main housing.

8. The image forming apparatus according to claim 1, wherein an axial direction of the lever axis is a widthwise direction of the sheet.

9. An image forming apparatus, comprising:

a main housing;

a process unit configured to form a toner image on a sheet; and a fixing device installable in and removable from an installation position in the main housing and configured to fix the toner image on the sheet, the fixing device comprising:

a heating member including a heater;

a pressure member configured to nip the sheet in combination with the heating member; and a lever rotatable between a first position and a second position about a lever axis extending in an axial direction, wherein the main housing comprises an interlock switch configured to allow power to be supplied to the heater in an on-state, and to shut off power to the heater in an off-state, wherein the lever includes:

a switch contacting portion configured such that:

in a case where the fixing device is installed in the installation position in the main housing and the lever is located in the first position, the switch contacting portion is in contact with the interlock switch to set the interlock switch to the on-state; and in a case where the fixing device is installed in the installation position in the main housing and the lever is located in the second position, the switch contacting portion is separated from the interlock switch to set the interlock switch to the off-state; and a to-be-pressed portion located between the lever axis and the switch contacting portion in an installation direction in which the fixing device is installed into the main housing, the to-be-pressed portion being configured to be pressed by the main housing and cause the lever to rotate from the first position toward the second position in a process of the fixing device being removed from the installation position, wherein when the fixing device rotates from the installation position about a first axis in the process of removing the fixing device from the installation position, the to-be-pressed portion is pressed by the main housing causing the lever to rotate.

10. The image forming apparatus according to claim 9, wherein a direction of rotation of the fixing device in the process of removing the fixing device from the installation position is the same as a direction of rotation of the lever from the first position to the second position.

11. The image forming apparatus according to claim 9, wherein the to-be-pressed portion is located between the first axis and the lever axis in the installation direction.

12. The image forming apparatus according to claim 9, wherein the lever further includes an engagement portion configured to engage the main housing and restrict the fixing device from being disengaged from the main housing when the lever is located in the first position.

13. The image forming apparatus according to claim 12, wherein a distance from the lever axis to the switch contacting portion is greater than a distance from the lever axis to the engagement portion.

14. The image forming apparatus according to claim 9, wherein the lever includes a holding portion graspable when the fixing device is to be removed from the main housing, in a case where the fixing device is installed in the installation position in the main housing and the holding portion is not grasped, the lever is located in the first position, and in a case where the fixing device is installed in the installation position in the main housing and the holding portion is grasped, the lever rotates from the first position to the second position.

15. The image forming apparatus according to claim 9, wherein the axial direction is a widthwise direction of the sheet.

16. An image forming apparatus, comprising:

a main housing;

a process unit configured to form a toner image on a sheet; and a fixing device installable in and removable from an installation position in the main housing and configured to fix the toner image on the sheet, the fixing device comprising:

a heating member including a heater;

a pressure member configured to nip the sheet in combination with the heating member; and a lever movable between a first position and a second position, wherein the main housing comprises an interlock switch configured to allow power to be supplied to the heater in an on-state and to shut off power to the heater in an off-state, wherein the lever includes:

a holding portion graspable when the fixing device is to be removed from the main housing;

a switch contacting portion contactable with the interlock switch, and an engagement portion configured to engage the main housing and restrict the fixing device from being disengaged from the main housing when the lever is located in the first position, wherein the main housing has an engagement hole configured to receive the engagement portion and to restrict the fixing device from being disengaged from the main housing when the engagement portion is received in the engagement hole, wherein in a case where the fixing device is installed in the installation position in the main housing and the lever is located at the first position, the switch contacting portion is in contact with the interlock switch to set the interlock switch to the on-state, and wherein in a case where the fixing device is installed in the installation position in the main housing and the lever is located at the second position, the switch contacting portion is separated from the interlock switch to set the interlock switch to the off-state.

17. The image forming apparatus according to claim 16, wherein in a case where the fixing device is installed in the installation position in the main housing and the holding portion is not grasped, the lever is located at the first position, and in a case where the fixing device is installed in the installation position in the main housing and the holding portion is grasped, the lever is located at the second position.

18. The image forming apparatus according to claim 16, wherein the lever is rotatable between the first position and the second position about a lever axis.

19. The image forming apparatus according to claim 16, wherein the lever is rotatable between the first position and the second position about a lever axis, and a distance from the lever axis to the switch contacting portion is greater than a distance from the lever axis to the engagement portion.

20. The image forming apparatus according to claim 19, wherein the switch contacting portion is a protrusion protruding in a direction of rotation of the lever, the engagement portion is a protrusion protruding in the direction of rotation of the lever and located upstream of the switch contacting portion in an installation direction in which the fixing device is installed into the main housing, and a dimension of the engagement hole in an axial direction of the lever axis is smaller than a dimension of the switch contacting portion in the axial direction.

* * * * *